United States Patent [19]
Brown

[11] Patent Number: 5,577,167
[45] Date of Patent: Nov. 19, 1996

[54] METHOD OF A MACHINE THAT LEARNS

[76] Inventor: Robert A. Brown, 8 Foster St., Mattapoisett, Mass. 02739

[21] Appl. No.: 415,296

[22] Filed: Apr. 3, 1995

Related U.S. Application Data

[62] Division of Ser. No. 155,587, Nov. 22, 1993.

[51] Int. Cl.$^6$ .................................................... G06F 15/46
[52] U.S. Cl. ................................ 395/23; 395/11; 395/20; 395/21
[58] Field of Search .................................. 395/23, 20, 21, 395/24, 11

[56] References Cited

U.S. PATENT DOCUMENTS

| | | | |
|---|---|---|---|
| 4,802,103 | 1/1989 | Faggin et al. | 395/900 |
| 4,989,256 | 1/1991 | Buckley | 395/27 |
| 5,075,868 | 12/1991 | Andes et al. | 395/24 |
| 5,253,328 | 10/1993 | Hartman | 395/24 |

*Primary Examiner*—George B. Davis

[57] ABSTRACT

A self-learning machine (10) with one or more sensor(s) (110) and actuator(s) (135), and a plurality of memory cells (20) that select actions for the actuator(s) (135) to be carried out during specific sensing and action periods, the selection being determined by the stored values in the memory cells (20) and the conditions identified by its sensor(s) (110) in these sensing and action periods. The stored values are reduced in the selecting memory cells (20) when they select specific actions, and the stored values are increased in selected memory cells (20) according to what actions actually occur within these specific sensing and action periods.

6 Claims, 9 Drawing Sheets

METHOD OF A MACHINE THAT LEARNS

This application is a divisional of application Ser. No. 08/155,587, filed Nov. 22, 1993.

BACKGROUND OF THE INVENTION

This invention relates to machines that produce an action in response to sensed conditions in discontinuous steps according to instructions stored in memories, specifically to a machine that establishes its own instructions according to the most likely action state previously encountered by the machine in each step for each sensed condition in each step.

BACKGROUND—DISCUSSION OF PRIOR ART

Most controlled machines are programmed to operate in a specific way before they are put into use. This programing process requires that a detailed set of instructions be produced to accomplish some desired result. This can be accomplished readily for simple control tasks such as cutting parts with a numerically controlled milling machine according to the specific dimensions of the part drawing. However, it may be difficult to know beforehand what conditions will be encountered, and what actions will be required in an application like a surveillance robot. The problem can be overcome by putting the machine into operation, and then using the machine to discover and incorporate the desired control behavior.

In general practice, there are two ways to incorporate the desired control behavior after a machine is put into use. One is based upon absolute (all-or-nothing) associative memories, as shown in U.S. Pat. No. 4,538,243 to Bernd Zehner (1985), and the other is based upon neural networks, as shown in U.S. Pat. No. 5,161,203 to B. Shawn Buckley (1992).

An absolute associative memory writes the input word (sensed condition) into the address of the output word (desired action). In use, the associative memory system searches for the output word (address) that contains the exact match of the input word either through the Boolean "and" function, or a mismatch through the Boolean "or" function. Thus it is called an associative content addressable memory (ACAM), and is considered self-learning since it learns the output word that occurs with each input word.

A neural network operates in much the same way as an associative memory. However, a neural network operates by altering weights common to specific input words and desired output words. In use, a neural network finds the output word in which the sum of the weights belonging to the extant input word is a maximum. This output word is considered the best fit to the input word. Since the best fit is conditional, according to the fitness of the other possible output words, a neural network can be considered to have a conditional memory. Nevertheless, associative memories and neural networks suffer from several disadvantages:

(a) If an associative memory cannot find an output word that exactly matches the input word, additional less restrictive searches must be made by the associative memory system to find the output word that is the best fit to the input word. In most robot applications, some action state (output word) is required for every sensed state (input word), nearly immediately. A robot machine controlled by an associative memory may not have enough time to make multiple searches to find the most desirable action state of each sensed state. Since the best fit output word is always found in every search in a conditional memory, a neural network is a more appropriate controller for a robot type machine.

(b) Memory-controlled machines must also deal with the question: Do specific input and output variables belong together as a group, or do they belong in separate groups? An associative memory cannot inherently make these distinctions. However, neural networks have the capability of being inherently self-organizing. That is to say, they can identify input and output variables that operate best when grouped together, and can identify the input and output variables that operate best when they are separate from other input and output variables.

(c) Associative memories and neural networks are designed around the binary (two-value) number system, which is less efficient than the trinary (three-value) number system.

(d) However, the analog circuitry required to accurately sum currents in a neural network is difficult to implement in the large scale integration of printed circuits (LSI) in comparison to the discrete operations of an associative memory. Usually, digital computers are used to simulate the operation of neural networks. However, the serial process of the digital computer imposes speed limitations on the inherently parallel process of neural networks.

OBJECTS AND ADVANTAGES

A great improvement in self-learning machines could be achieved by the creation of a discrete memory system that can perform the many functions of a neural network. A complete discussion of this kind of self-learning machine is presented in my book entitled *Machines That Learn* (1994), Oxford University Press. Accordingly, several objects and advantages of my invention are as follows:

(a) My self-learning machine learns the actions that are desired by its operators, or discovers and incorporates whatever actions are allowed by its environment, as each new condition is encountered. It uses discrete conditional memory cells that store a range of analog values rather than the single absolute (all-or-nothing) state of an associative memory. The analog value stored in each conditional memory cell is adjusted automatically in the manner of the lagged demand register in my own U.S. Pat. No. 3,325,732 (1967), according to the historical probability of each output word occurring with each input word, instead of being changed in the all-or-nothing manner of an associative memory. Thus, the relative fitness of each output word for a given input word can be found in a single search.

(b) Since the analog value of each conditional memory cell in the self-learning memory matrices described herein can be adjusted automatically according to the concurrence of output states with input states, the state of all of the input variables can determine the state of all of the output variable in a unitary organization. Or, the state of individual input variables can determine the state of individual output variables despite the state of other input variables in a diverse organization. Thus, the simple self-learning memory matrices described herein are inherently self-organizing.

(c) The input and output variables of a memory-controlled machine can be digitized by means of an input encoder, output decoder, and feedback encoder. This greatly reduces the number of memory cells required to produce machine behavior with a given input/output resolution. Moreover, these digitizing devices can be readily designed to operate in the trinary number system, which is significantly more efficient than the binary number system used in associative memories and neural networks.

(d) These discrete conditional memory cells also can be arranged in matrices similar to conventional discrete memories, allowing these self-learning memory circuits to be readily implemented using the large scale integration (LSI) techniques commonly used with conventional and associative memories. Thus, the self-learning memory matrices shown herein act like neural networks, while retaining the basic simplicity of absolute associative memories.

Still, further objects and advantages will become apparent from a consideration of the following description and drawings.

DRAWINGS FIGURES

SUMMARY OF INVENTION

This invention provides a machine that recognizes the input state that occurs at predetermined moments in time, selects the output state that has most often occurred with this input state based upon its memory using the Boolean "and" function, reduces its propensity to select that output state when that input state occurs in the future, attempts to produce the selected output state within a predetermined period of its recognition of the input state, measures the actual output state that takes place within a predetermined period of its attempt to produce the output state, and increases its propensity to select the actual output state when that input state occurs in the future.

A simple way of carrying out the Boolean "and" function is by means of a set of discrete switches (memory cells) connected in series. The set of cells can represent a specific output word. Of this output word set, the cells representing values of a given input variable can be connected in parallel, and each of these sets of cells can be connected in series, as shown herein. A cell can be made to conduct by applying a sufficient ramp voltage to its search terminal, and applying a voltage to its sense terminal to represent the value of some part of an input word. If a cell in each set of cells is made conductive by the input word, and an output-enable voltage is applied to one end of the output word set, the set of cells will conduct the output-enable voltage to an output terminal, signifying the selection of that output word. If a cell in just one set of cells is nonconductive, the set of cells will not conduct, signifying that this output word is not selected. Moreover, the propensity of each cell to conduct can be adjusted by changing the sensitivity of each cell to the ramp voltage. The sensitivity of each cell can be adjusted according to the concurrence of an input word and the output word of which it is a part. Thus, an output word will be selected for the extant input word at some ramp voltage in a single search. Once an output word is selected, the output-enable voltage can be discontinued so that only one output word is selected in that search. If the output-enable voltage is maintained, a list of output words will be generated in the rank order of their fitness to the input word as the ramp voltage continues to rise.

Description of Embodiments

Figure 6:
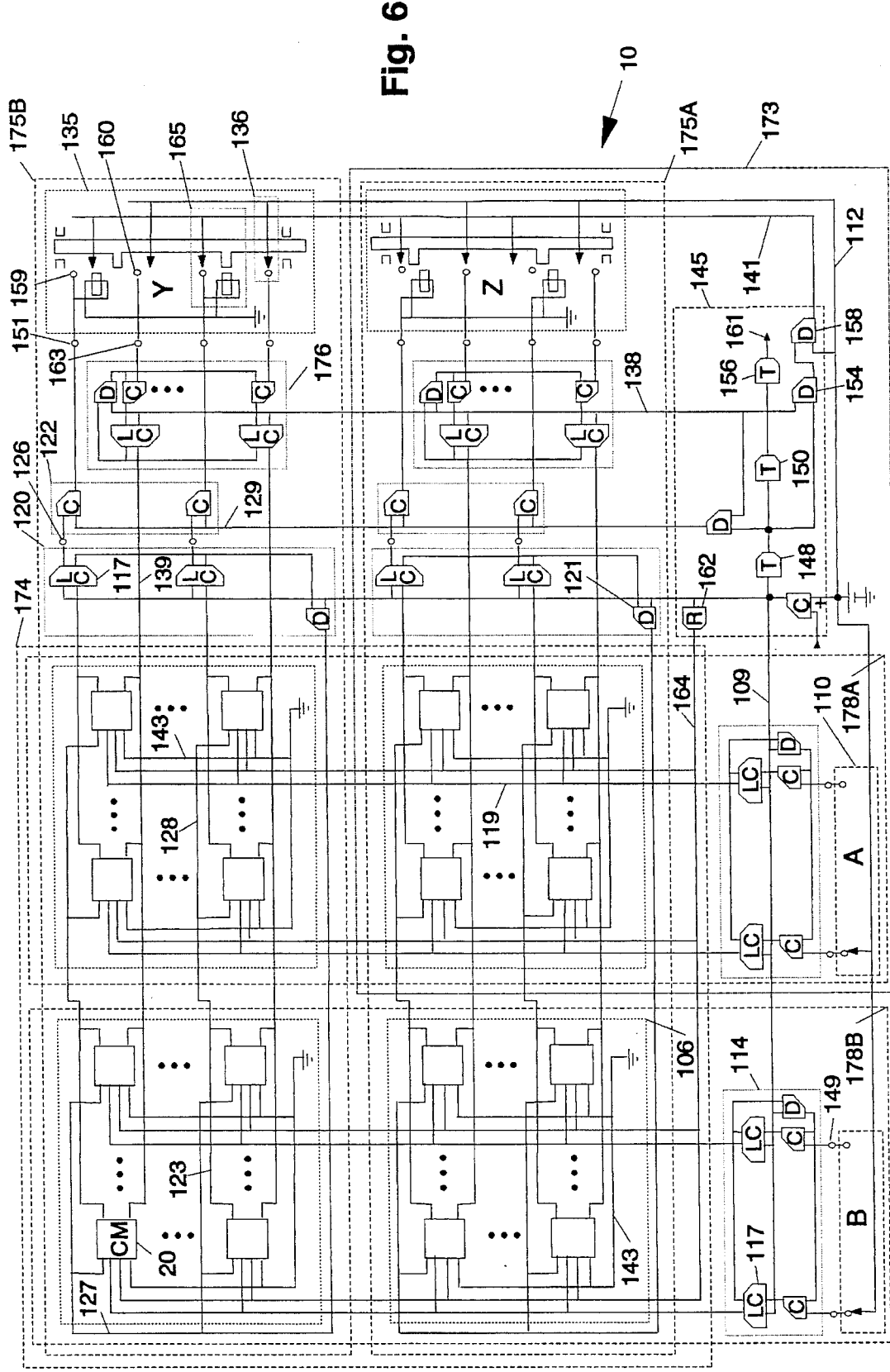
FIG. 6 is a schematic drawing of a monolithic self-learning machine that contains a monolithic memory matrix of memory submatrices connected to multiple sensor and actuator variables.
Figure 9:
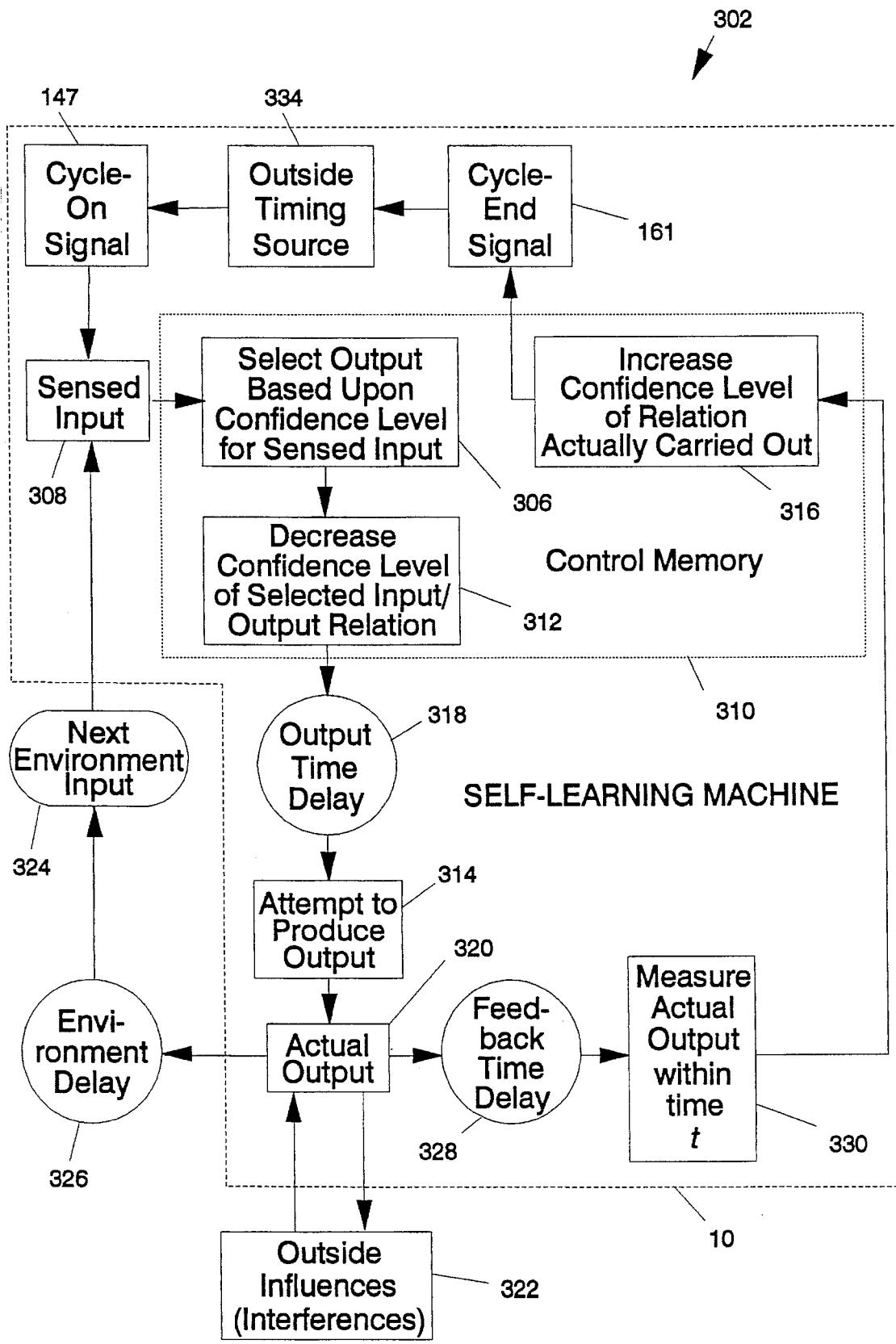
FIG. 9 is a flowchart of the empirical algorithm used by self-learning machines.

A self-learning machine 10 shown in FIG. 6 is made up of a sensor or sensors 110 that identify conditions in an environment at particular moments determined by an outside timing source 334 shown in FIG. 9, a set of scalar memory submatrices 106 made up of conditional memory cells 20, which select actions based upon these sensed conditions and their stored sensitivity values, causing the sensitivity of the selecting memory cells 20 to be reduced, an actuator or actuators 135, which attempt to produce these selected actions, and a feedback circuit 136, 176 and 139, which measures the actual actions at particular moments, causing the sensitivity of the feedback-selected memory cells 20 to increase, and a cycle logic controller 145, which governs the sequence of sensing, selecting, and production and measurement of actions, as described in the following drawings.

Description of a conditional memory cell

Figure 1:
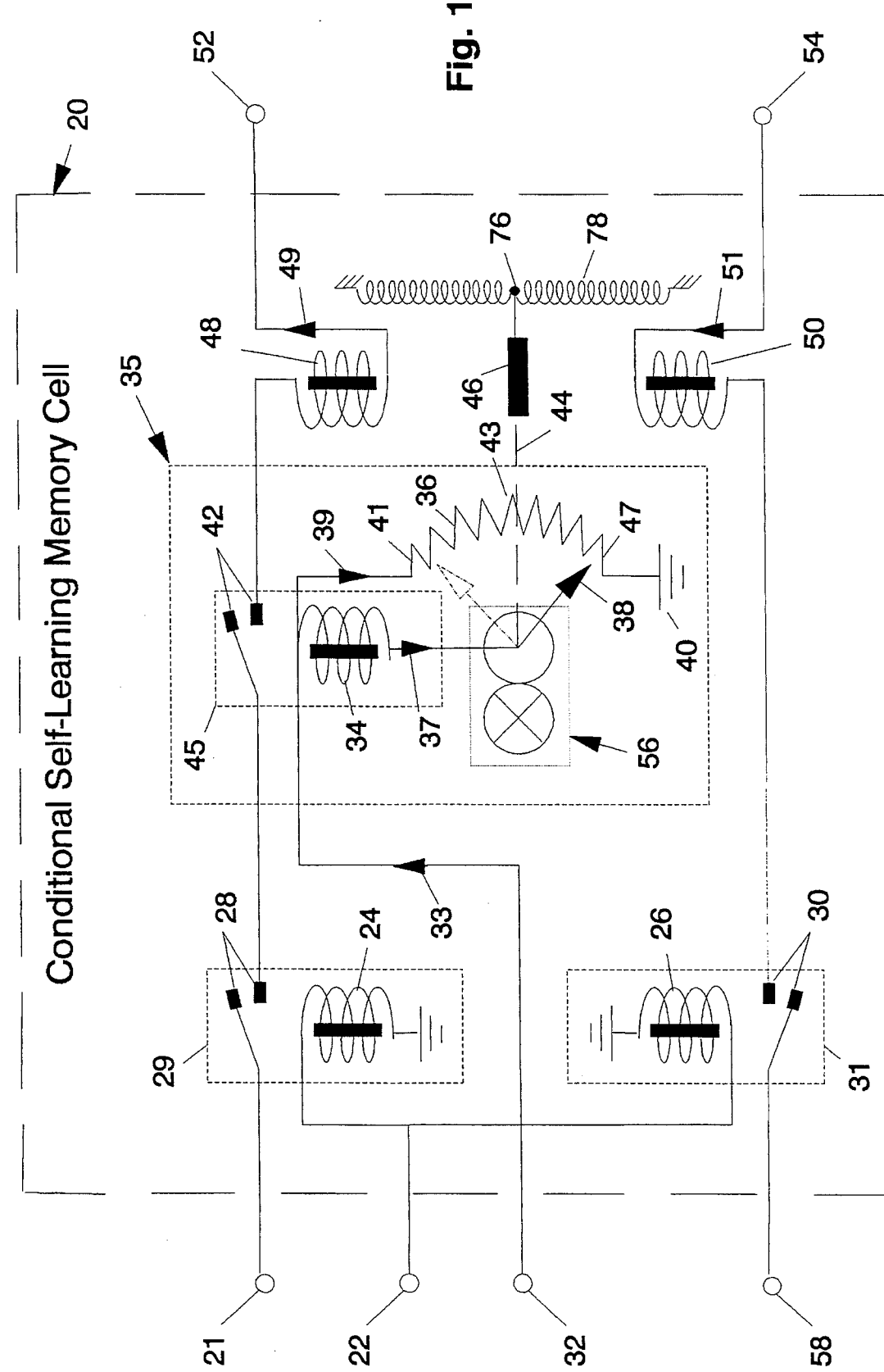
FIG. 1 is a detailed schematic of a single conditional self-learning memory cell.
Figure 5:
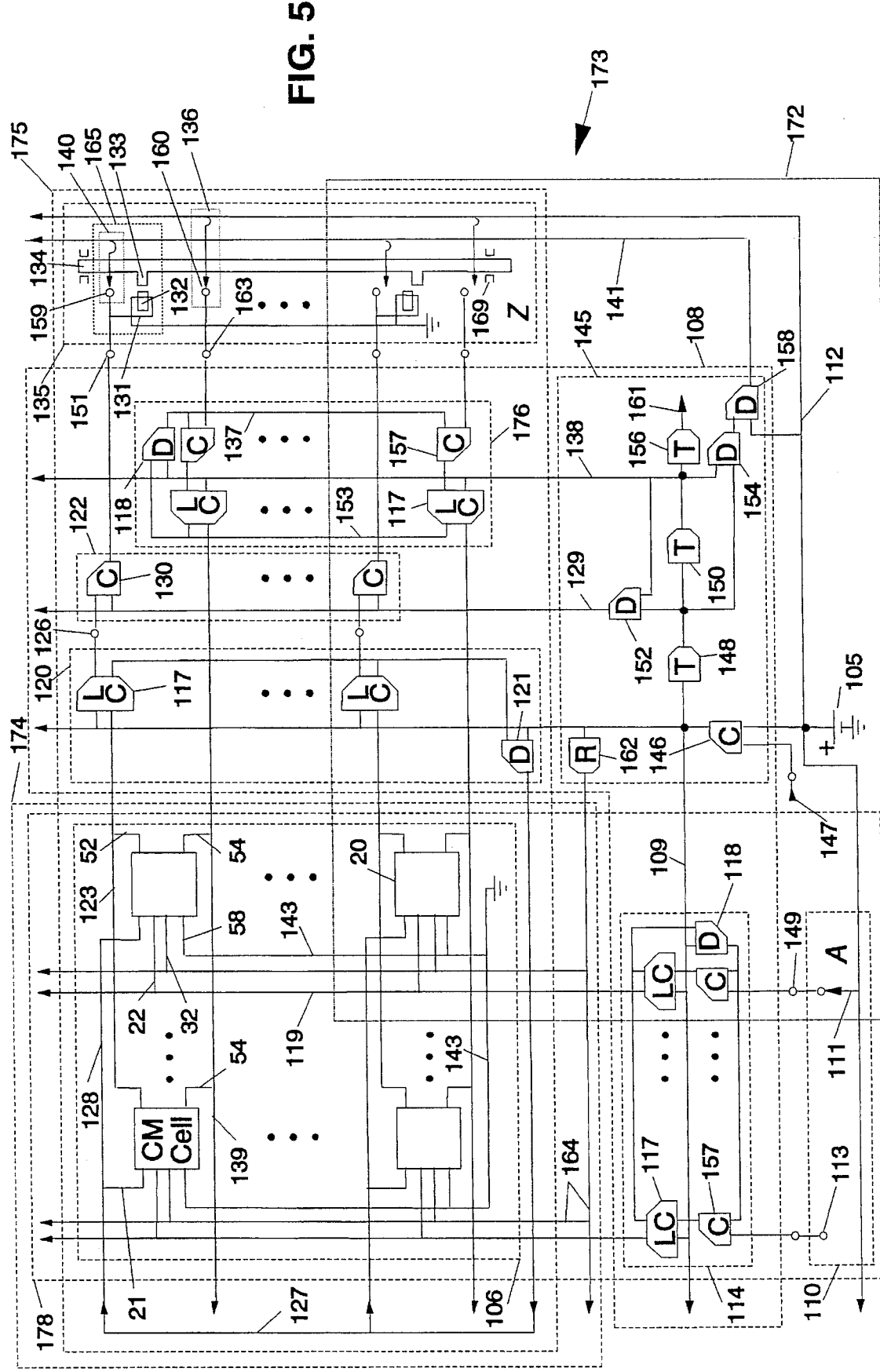
FIG. 5 is a schematic drawing of a portion of a self-learning machine that includes a scalar self-learning memory submatrix connected to its single sensor variable and a single actuator variable.

The conditional memory cell 20 shown in FIG. 1 is the basic memory element used in a self-learning conditional memory submatrix 106 shown in FIG. 5. The conditional memory cell 20 is used to select a specific output state in response to a specific input state in a given transition (sensing and action) cycle. The conditional memory cell 20 includes a sense terminal 22 that represents a specific input state, and is connected to an output-enable coil 24 and a feedback-enable coil 26. The output-enable coil 24 is designed to close the normally open contacts 28 of the output-enable connect 29 when the sense terminal 22 is energized by a particular input state. The feedback-enable coil 26 is designed to close the normally open contacts 30 of the feedback-enable connect 31 when the sense terminal 22 is energized a particular input state. The memory cell 20 also includes a search terminal 32, which is connected to one end of a search coil 34 and a variable resistor element such as a slidewire 36 connected to ground 40. The other end of the search coil 34 is connected to a contact wiper arm 38 of the slidewire 36. The wiper arm 38 contacts the slidewire 36 such that the amount of current that flows through the search coil 34 from the search terminal 32 at a given voltage is determined by the position of the wiper arm 38 on the slidewire 36. The output contacts 42, search coil 34, wiper arm 38, and slidewire resistor element 36 form a voltage sensitivity switch 35.

Sensitivity of the voltage-sensitive switch

With a given voltage level on the search terminal 32, maximum current flows through the search coil 34 when the wiper arm 38 is closest to the ground 40 of the slidewire 36, and minimum current flows through the search coil 34 when the wiper arm 38 is furthermost from the ground 40 of the slidewire element 36. The contacts 42 of the output connect 45 are designed to close at some predetermined current level in coil 34. Therefore, the output contacts 42 in the voltage-sensitive switch 35 close when there is a predetermined low voltage present at the search terminal 32, and the contact armature 38 is in the maximum current position 47. Or, the output contacts 42 close then there is a predetermined high voltage present at the search terminal 32, and the contact armature 38 is in the minimum current position 41. Accordingly, the output contacts 42 are designed to close when the contact armature 38 is in positions intermediate between the minimum position 41 and maximum position 47, and the voltage present at the search terminal 32 is intermediate between the predetermined low and high level. Thus, if a voltage ramp 104 is applied to the search terminal 32, the output contacts 42 close at some voltage level determined by the position of the wiper arm 38. Therefore, the position of the wiper arm 38 determines the sensitivity (S) of the voltage-sensitive switch 35, and the position of the wiper arm 38 is used as an analog memory record of the sensitivity (S) of that conditional memory cell 20.

Calculation of sensitivity

The sensitivity (S) of the voltage-sensitive switch 35 is equal to one minus the ratio of the actual voltage ($V_a$) required to close the contacts 42 of the voltage-sensitive switch 35 minus the intrinsic voltage ($V_i$) required to close the contacts 42 of the connect 45 when the armature 38 is in the maximum current position 47, to the maximum voltage ($V_m$) required to close the contacts 42 when contact armature 38 in the minimum current position 41, as shown by Eq. 1.

$$S=1-(V_a-V_i)/V_m. \qquad \text{Eq. 1}$$

For example, the intrinsic voltage ($V_i$) could be 0.1 volts, and the maximum voltage ($V_m$) could be 10 volts. If the contact armature 38 is in the minimum current position 41, then the sensitivity (S) of the voltage-sensitive switch 35 is 1−(10 0.1)/10 =0.01. If the armature 38 is in the mid position 43, such that 5 volts are required to close the contacts 42, then the sensitivity (S) of the voltage-sensitive switch 35 is 1−(5 −0.1)/10 =0.51. If the armature 38 is in the maximum current position 47, then the sensitivity (S) of the voltage-sensitive switch 35 is 1−(0.1−0.1)/10=1.

Changing sensitivity

Figure 2:
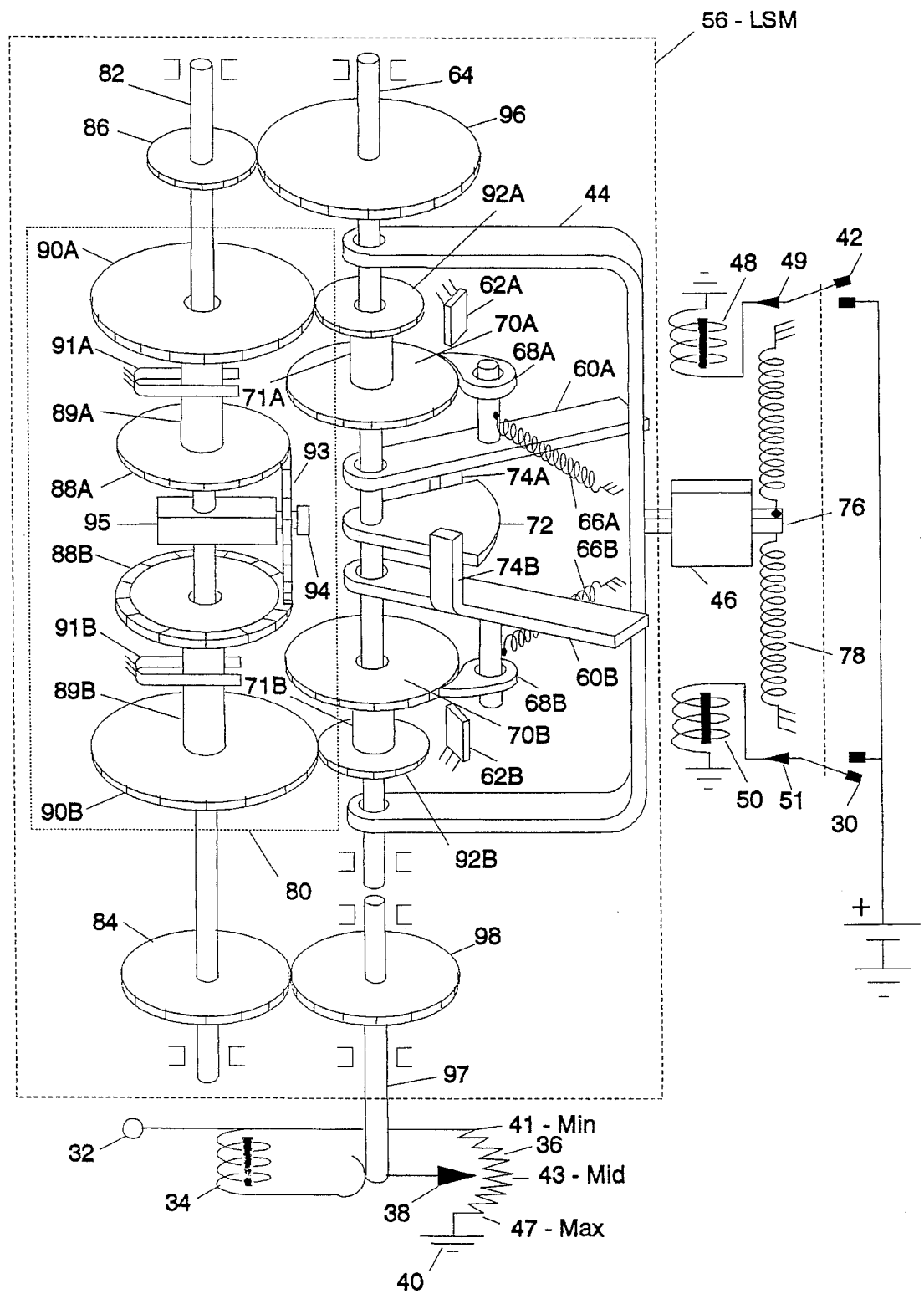
FIG. 2 is an isometric drawing of the logarithmic subtracting mechanism in the conditional memory cell shown in FIG. 1.

The conditional memory cell 20 also contains a bail 44 and pole piece 46 that changes the position of the wiper arm 38 by a fixed ratio of its position from the minimum position 41 or maximum position 47 through the logarithmic subtracting mechanism (LSM) 56, as shown in FIG. 2, whenever a sufficient current 49 flows through the minimum coil 48, or a sufficient current 51 flows through the maximum coil 50. Sufficient current 49 flows through the minimum coil 48 whenever a predetermined voltage is present at the output-enable terminal 21, the output-enable contacts 28 are closed, output contacts 42 are closed, and the output terminal 52 is grounded. A sufficient current 51 flows through the maximum coil 50 whenever a predetermined voltage is present at the feedback terminal 54, the feedback-enable contacts 30 are closed, and the feedback-complete terminal 58 is grounded. Thus, the position of the wiper arm 38 is determined by the number of times the minimum coil 48 is energized relative to the number of times the maximum coil 50 is energized.

Description of the logarithmic subtraction mechanism

FIG. 2 shows an isometric drawing of the logarithmic subtraction mechanism 56 referred to in FIG. 1. The logarithmic subtraction mechanism 56 is used to change and store the analog record of the sensitivity (S) in the conditional memory cell 20. The pole piece 46, bail 44, minimum coil 48, and maximum coil 50 shown in the memory cell 20 in FIG. 1 can rotate minimum lever 60A or maximum lever 60B to a fixed minimum stop position 62A, or fixed maximum stop position 62B around a main shaft 64 against a minimum spring 66A or maximum spring 66B, according to which coil 48 or 50 is energized. A pawl 68A on minimum lever 60A or a pawl 68B on maximum lever 60B engages and rotates a minimum ratchet wheel 70A or maximum ratchet wheel 70B according to which lever 60A or 60B is moved. A moveable stop 72 connected to the main shaft 64 prohibits either lever 60A or 60B from returning past a position determined by the position of the movable stop 72 by virtue of a minimum lug 74A on the minimum lever 60A or a maximum lug 74B on the maximum lever 60B when the minimum coil 48 or the maximum coil 50 is de-energized, and the bail 44 returns to a center position 76 by the action of a bail spring 78. Thus, the amount of rotation of each ratchet wheel 70A or 70B is determined by the position of the moveable stop 72 when the minimum coil 48 is energized by the write-minimum contacts 42, or the maximum coil 50 is energized is energized by the write-maximum contacts 30.

Ratchet wheels 70A and 70B are connected to the ratchet output gears 92A and 92B by ratchet hubs 71A and 71B respectively. The ratchet output gears 92A and 92B mesh with the differential input gears 90A and 90B. The differential input gears 90A and 90B are connected to the differential side members 88A and 88B by the differential hubs 89A and 89B respectively. Thus, the ratchet wheels 70A or 70B drive the side members 88A or 88B of the differential 80 through a predetermined gear ratio by virtue of the mesh between the differential input gear 90A and ratchet output gear 92A, or the differential input 90B and ratchet output gear 92B. Friction members 91A and 91B act upon the differential hubs 89A and 89B to keep the differential side members 88A and 88B from moving except in response to the movement of their respective differential input gears 90A and 90B.

The difference between the movement of side members 88A and 88B determines the position of the differential center member 93 mounted on the center shaft 94. The center shaft 94 is rigidly connected to the differential shaft 82 by the differential center support block 95. Thus, the output position of the differential shaft 82 represents the difference between the movement of ratchet wheels 70A and 70B.

The differential shaft 82 is connected to the main shaft 64 through a second differential output gear 86 and a main shaft input gear 96. Thus, the moveable stop 72 is positioned by the output of the mechanical differential 80 through a ratio of movement determined by gears 86 and 96. The differential shaft 82 is also connected to a wiper arm shaft 97 through the first differential output gear 84 and wiper arm gear 98. Wiper arm 38 is rigidly connected to the wiper arm shaft 97. Alternatively, the wiper arm 38 can be mounted upon the main shaft 64 directly. Thus, the positions of the movable stop 72 and the wiper arm 38 are changed according to the gear ratio between the ratchet wheels 70A and 70B and the differential side members 88A and 88B, the gear ratio between the differential shaft 82 and the main shaft 64, and the amount that levers 60A and 60B are moved by the bail 44.

Description of response curves

Figure 3A:
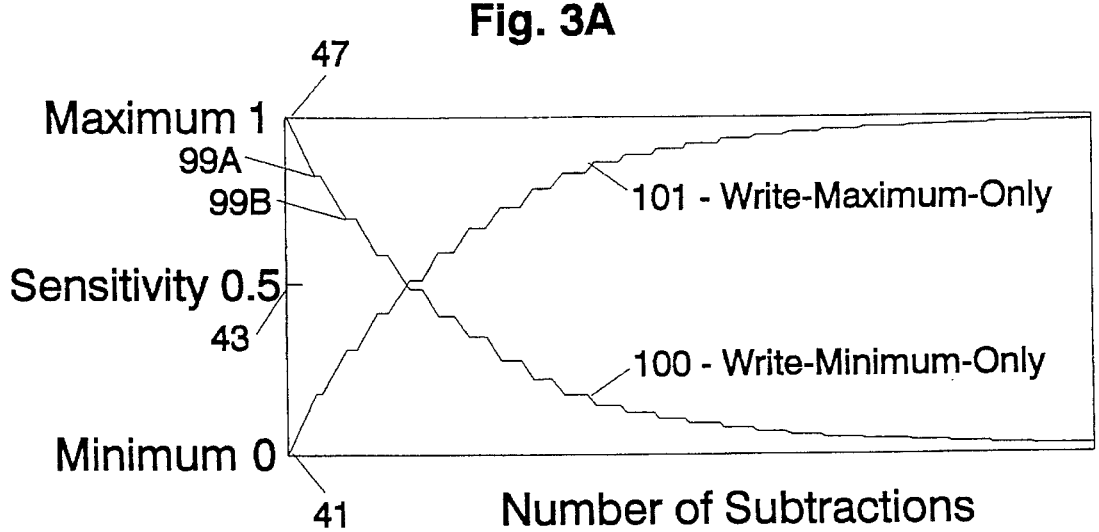
FIGS. 3A and 3B are curves showing the changes in sensitivity created by the logarithmic subtracting mechanism in FIG. 2 in response to different learning conditions.
Figure 3B:
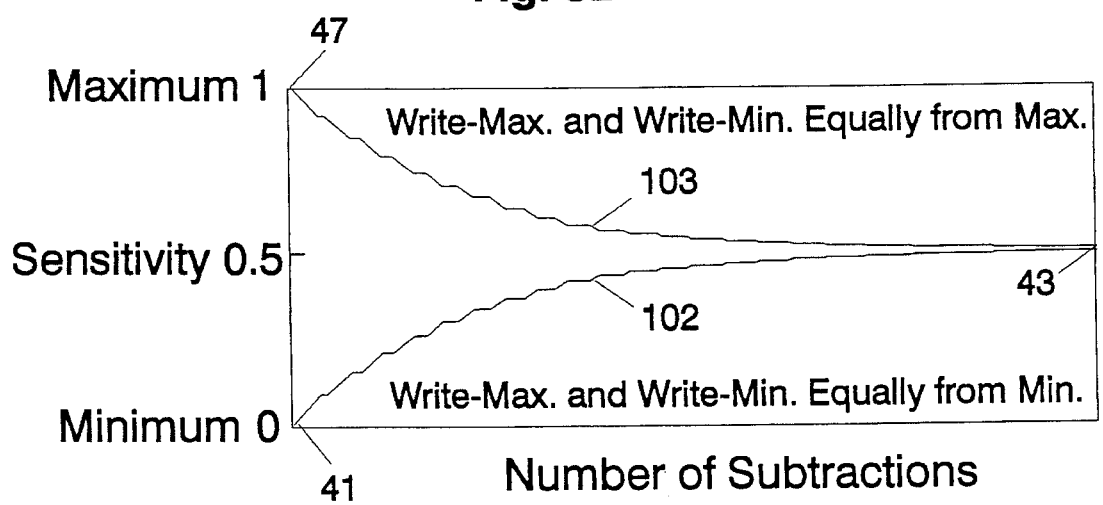

FIGS. 3A and 3B show response curves 100, 101, 102, and 103 that represent the position of the wiper arm 38 (FIGS. 1 and 2) under different learning conditions. The write-minimum only curve 100 in FIG. 3A shows the position of the wiper arm 38 starting from the maximum position 47, proceeding asymptotically toward the minimum position 41 when the minimum coil 48 only (FIG. 1) is energized repeatedly. The write-maximum only curve 101 shows the position of the wiper arm 38 starting from the minimum position 41, proceeding asymptotically toward the maximum position 47 when the maximum coil 50 only (FIG. 1) is energized repeatedly.

The write equally from minimum curve 102 in FIG. 3B shows how the position of the wiper arm 38 moves asymptotically toward the mid-position 43 when the wiper arm 38 starts from the minimum position 41, and the minimum coil 48 and maximum coil 50 are energized repeatedly in succession. The write equally from maximum curve 103 shows how the position of the wiper arm 38 moves from the maximum position 47 to the mid-position also when the minimum coil 48 and maximum coil 50 are energized repeatedly in succession.

Description of the ramp curve

Figure 3C:
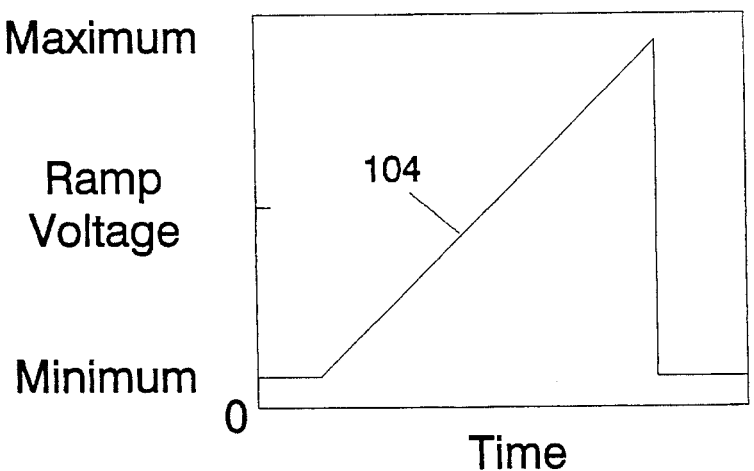
FIG. 3C shows the ramp voltage curve created by the ramp generator to search for the most sensitive self-learning conditional memory cell.
Figure 4:
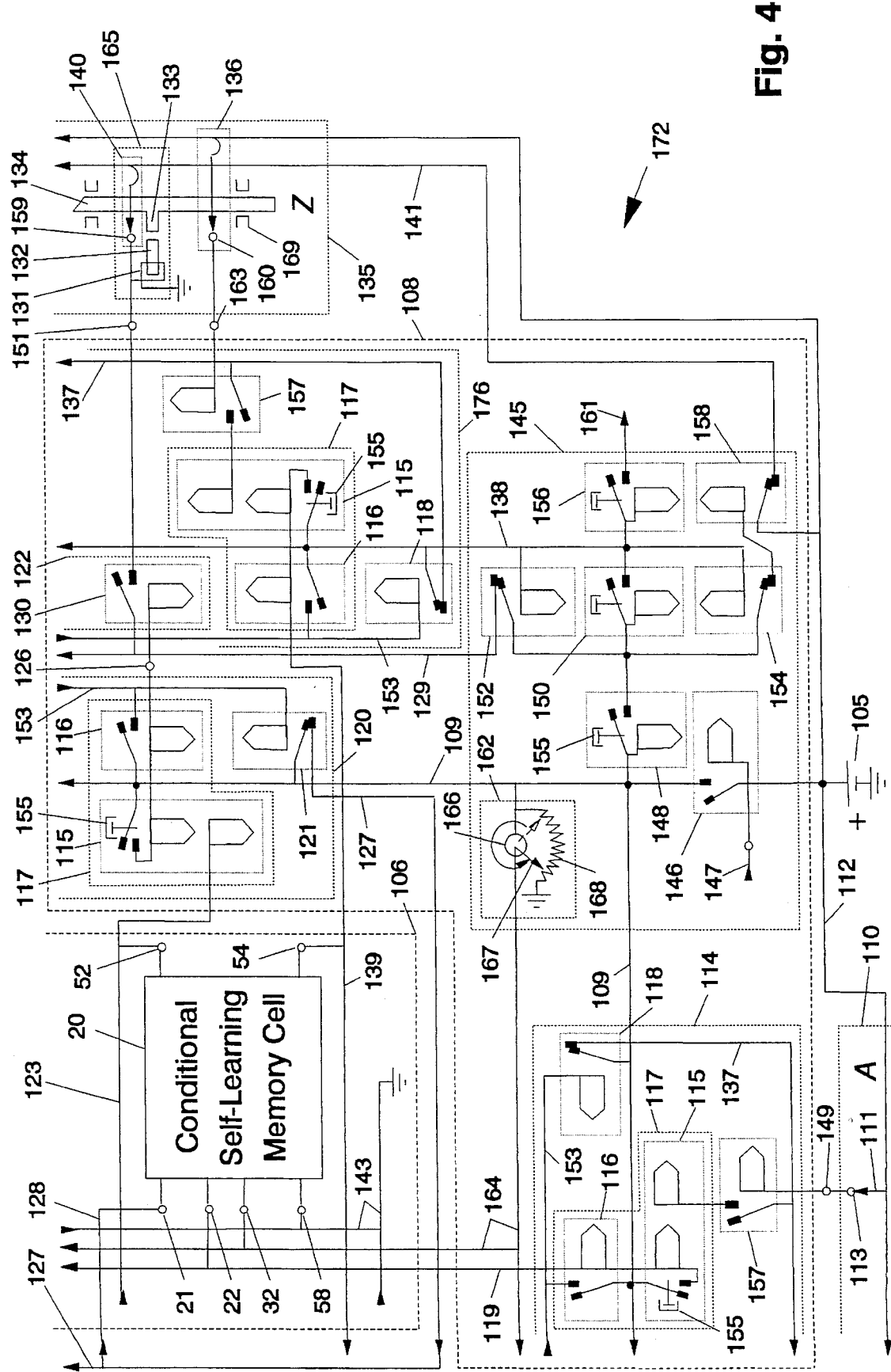
FIG. 4 is a detailed schematic of a portion of a self-learning machine that includes only a single conditional memory cell.

FIG. 3C shows the voltage ramp curve 104 used to interrogate the sensitivity of all of the memory cells 20 in a memory matrix 106, as shown in FIG. 4. The ramp curve 104 is created by the forward-selecting ramp generator 162 shown in FIG. 4.

Description of a portion of a self-learning machine with single memory cell

FIG. 4 shows a detailed schematic of a portion 172 of a self-learning machine 10 that includes a portion of a scalar memory submatrix 106 that shows only one memory cell 20, a matrix driver 108 that includes a matrix input interface circuit 114, a ramp generator 162, a matrix output interface circuit 120, a feedback interface circuit 176, and a cycle logic controller 145, which is activated by a power source 105 from a cycle-on signal 147, and a sensor 110 and an actuator and brake 135.

Cycle logic controller

The cycle logic controller 145 directs the events that take place during a transition cycle, and includes a cycle-on connect switch 146 that energizes the input/output interface bus 109 when the cycle-on signal 147 is produced by the outside timing source 334 (FIG. 9) for the duration of a transition cycle. The cycle logic controller 145 also includes an actuator delay timer 148 that drives the actuator-enable bus 129 and a brake disconnect 158 through a brake reconnect 154, and a feedback delay timer 150 that drives the global feedback-enable bus 138, an actuator-enable disconnect 152, and a cycle-end timer 156, which produces a cycle-end signal 161. The cycle-end signal 161 is used by the outside timing source 334 to discontinue the cycle-on signal 147 at the end of a given transition cycle.

Sensor

The sensor 110 has a slidewire 112 connected to a movable switch armature 111. The slidewire 112 can be permanently connected to the power source 105. The switch armature 111 is placed in contact with any one of the plurality of sensor switch terminals 113 according to the value of the sensor variable A.

Matrix input interface circuit

Each sensor switch terminal 113 is connected to an input connect 157 that is enabled by an interface disconnect 118. Each input connect 157 represents a given value of the sensor variable A. Each input connect 157 is connected to an input latch circuit 115 within a latch-and-connect circuit 117. The latch-and-connect circuit 117 includes a connect 116 that is connected to the matrix interface disconnect 118 by the interface disconnect bus 153. The input interface circuit 114 includes as many input connects 157 and latch-and-connect circuits 117 as there are values of the sensor variable A, and permits only one latch-and-connect circuit 117 in the input interface circuit 114 to be energized in a given transition cycle.

A damper 155 can be placed on the contact armature belonging to each input latch circuit 115 to make sure that the sensor switch armature 111 dwells on the sensor terminal 113 for more than a brief moment before the contacts of the input latch circuit 115 are closed. Thus, the damper 155 does not allow an input latch-and-connect circuit 117 to latch in any value of a rapidly moving (slewing) sensor switch armature 111.

Ramp generator

The ramp generator circuit 162 within the matrix driver 108 tests the sensitivity of every memory cell 20 in the submatrix 106. The ramp generator circuit 162 includes a ramp bus 164, a drive motor 166, a contact armature 167, and a variable resistor element 168.

Matrix output interface circuit

The matrix output interface 120 within the matrix driver 108 includes a set of latch-and-connect circuits 117 made up of the latch circuit 115 and the connect 116, the interface disconnect bus 153, and an output-enable disconnect 121 that disconnects an output-enable bus 127. The matrix driver 108 also includes an actuator-enable bus 129 that enables an actuator-enable connect 130. The contacts of the actuator-enable connect 130 are closed by the output interface circuit 120 through a matrix output terminal 126 belonging to a given output latch-and-connect circuit 117. Each actuator-enable connect 130 represents a given value of the actuator variable Z.

Actuator and brake

Each position value of the actuator and brake 135 consists of an actuator coil 131 and stator pole 132 belonging to a specific armature pole 133 of an actuator armature 134. The actuator armature 134 is supported by armature bearings 169, and contains a set of feedback switches 136, each of which connects the main power bus 112 to a particular a feedback terminal 160 according to the actual (measured) value of the actuator variable Z, which will be called the actuator co-variable Z'. The actuator and brake 135 also includes a set of brake switches 140 that connect a brake bus 141 to a particular actuator coil 131 through the brake terminal 159 according to the actual value of the actuator co-variable Z'.

Matrix feedback interface circuit

The matrix driver 108 also includes a matrix feedback interface circuit 176 that contains a set of latch-and-connect circuits 117 and input connects 157, each of which is connected to a matrix output co-terminal 163. The feedback interface circuit is energized by the feedback-enable bus 138 when the feedback delay timer 150 times out. One latch-and-connect circuit 117 in the feedback interface circuit 176 produces a voltage on its feedback terminal bus 139 when its corresponding input connect 157 is energized, and then the feedback interface circuit 176 disconnects all of its input connects 157 through its input disconnect 118 in the manner of the input interface circuit 114. This allows only one feedback terminal bus 139 belonging to the feedback interface circuit 176 to be energized in a given transition cycle.

Cycle-end timer

The cycle-end timer 156 is also energized by the output of the feedback delay timer 150. When the cycle-end timer 156 times out, it sends a cycle-end signal 161 to the outside timing source 334 indicating that the machine 10 has completed a transition cycle. This causes the outside timing source 334 to discontinue the cycle-on signal 147 at the cycle-on connect 146. This discontinues electrical power to all of the components in the machine 10 except the actuator brake 165. This allows all of the connects, disconnects, and latches in the machine 10 to return to their normal positions, and allows the bail 46 of the feedback-selected memory cell 20 in each submatrix 106 to return to its normal center position 76.

Description of a scalar controlled machine

FIG. 5 shows a larger view 173 of a self-learning machine 10 that includes the portion 172 of the self-learning machine shown in FIG. 4 and the rest of the scalar memory submatrix 106 connected to a single sensor variable A and a single actuator variable Z. A scalar machine 172 contains as many sensor latch-and-connect circuits 117 in its input interface circuit 114 as values of its sensor 110, and contains as many output latch-and-connect circuits 117 in its output interface circuit 120 as it has values of its actuator 135.

Scalar submatrix

Each scalar submatrix 106 contains as many columns of memory cells 20 as there are values of its scalar sensor variable A belonging to a single sensor 110, and each submatrix 106 contains as many rows of memory cells 20 as there are values of its scalar actuator variable Z belonging to a single actuator 135. An output-enable terminal 21 of every memory cell 20 in a row is connected to a given output-enable terminal bus 128. The sense terminal 22 of every memory cell 20 in each column is connected to a sense terminal bus 119 belonging to a given input latch-and-connect circuit 117. The search terminal 32 of every memory cell 20 in the submatrix 106 is connected by the ramp bus 164 to the ramp generator 162. The feedback terminal 54 of every memory cell 20 in a given row is connected to the given feedback terminal bus 139 that is associated with a given value of the actuator 135. The feedback-complete terminal 58 of every memory cell 20 in a given scalar submatrix 106 is connected to the feedback-complete terminal bus 143, which is connected to ground. The scalar submatrix 106 can energize a specific output terminal bus 123 whenever a specific sense terminal bus 119 is energized within a given transition cycle, according to the content of the memory cells 20 in the scalar submatrix 106, as explained in the discussion of FIG. 4.

Vernier actuator

Each actuator-enable connect 130 is connected the actuator coil 131 having the stator pole 132 that operates upon a single armature pole 133 on the actuator armature 134. These armature poles 133 are distributed along the actuator armature 134 in a spacing that is slightly greater or slightly less that the spacing of the stator poles 132. The set of armature poles 133 are held a fixed distance away from the stator poles 132 by the action of the end bearings 169 upon the actuator armature 134. However, the end bearings 169 allow the actuator armature 134 to move parallel to the stator poles 132, creating a vernier effect. That is to say, a unique position of the armature 134 is obtained whenever an armature pole 133 lines up with its related stator pole 132.

Actuator brake and feedback terminals

The actuator armature 134 positions the set of brake switches 140 spaced at intervals along the armature 134 such that a given brake switch 140 is closed when a given set of related poles 132 and 133 line up. This allows a voltage on the brake bus 141 to appear on the brake terminal 159 at a given actuator coil 131 whenever its brake switch 140 is closed. This voltage causes a current to flow through the actuator coil 131 of that actuator brake 165, creating a holding force that attempts to keep the armature pole 133 lined up with its related stator pole 132 at that location for as long as the voltage on the brake bus 141 is maintained.

The actuator armature 134 also positions a set of feedback switches 136 spaced at intervals along the armature 134 such that a given feedback switch 136 is closed whenever a given set of related poles 132 and 133 line up. This allows a voltage from the main power bus 112 to appear on the feedback terminal 160 connected to whatever feedback switch 136 is closed.

Description of a monolithic self-learning machine

FIG. 6 shows a monolithic self-learning machine 10 that has a monolithic matrix 174 made up of a set of scalar submatrices 106, one of which is part of the portion self-learning machine 173 shown in FIG. 5. The monolithic memory matrix 174 is connected to multiple sensors 110 and multiple actuators 135. The input/output interface bus 109 and the power bus 112 are extended to every sensor 110 and every actuator 135. The actuator-enable bus 129, the feedback-enable bus 138, the actuator brake bus 141, and the power bus 112 are extended to every actuator 135 in the monolithic self-learning machine 10. Each scalar submatrix 106 is connected to a unique combination of a sensor 110 and an actuator 135.

Set of submatrices belonging to a sensor variable

The monolithic memory matrix 174 contains a set 178 of submatrices 106 that are associated with a given sensor variable 110. All of the memory cells 20 in each submatrix 106 in the set 178 are connected to the input sense terminal buses 119 associated with each value of the sensor variable 110 belonging to that set 178.

Set of submatrices belonging to an actuator variable

The monolithic memory matrix 174 also contains a set 175 of submatrices 106 that are associated with a given actuator 135. All of the memory cells 20 in each submatrix 106 in the set 175 are connected to the output-enable terminal buses 128, output terminal buses 123, feedback terminal buses 139, and feedback-complete terminal buses 143 associated with each value of the actuator variable 135 belonging to that set 175.

Submatrix connections

In the monolithic memory matrix 174, each output terminal bus 123 associated with a given value of an actuator variable 135 in each submatrix 106 is connected to the output-enable terminal bus 128 associated with the same value of an actuator variable 135 in each submatrix 106 immediately to the right, except for the output terminal buses 123 in the submatrix 106 closest to the actuator 135. The output terminal buses 123 closest to their actuators 135 are connected to their respective output latch-and-connects 117 in the output interface circuit 120. Each output latch-and-connect circuit 117 belonging to a given actuator 135 is connected to an output-enable disconnect 121 that removes electrical power to the output-enable bus 127 feeding all of the memory cells 20 in the set 175 of submatrices 106 associated with a given actuator 135 for the remainder of the transition cycle whenever any one latch-and-connect circuits 117 in that set 175 of submatrices 106 is energized. This ensures that only one output latch-and-connect 117 is selected by the set 175 of submatrices 106 associated with a given actuator 135 in each transition cycle.

Unitary relations in a monolithic self-learning machine

The monolithic self-learning machine 10 can establish unitary relations between its sensor variables A, B, etc. and actuator variables Z, Y, etc. That is to say, the monolithic machine 10 can produce a unique combination of values of its actuator variables Z, Y, etc. for each unique combination of values of its sensor variables A, B, etc.

Asynchronous diverse relations in a monolithic self-learning machine

The monolithic self-learning machine 10 can establish asynchronous diverse relations between specific sensor variables A, B, etc. and specific actuator variables Z, Y, etc. That is to say, the monolithic machine 10 can produce specific values of one or more actuator variables Z, Y for specific values of one or more sensor variables A, B, despite the values of the other sensor variables. For example, if all of the memory cells 20 connected to sensor variable B are set in a high-sensitivity state, then sensor variable A can select a value of actuators Z and Y for each of its values, regardless of the values of B.

Description of a digitized monolithic self-learning machine

Figure 7:
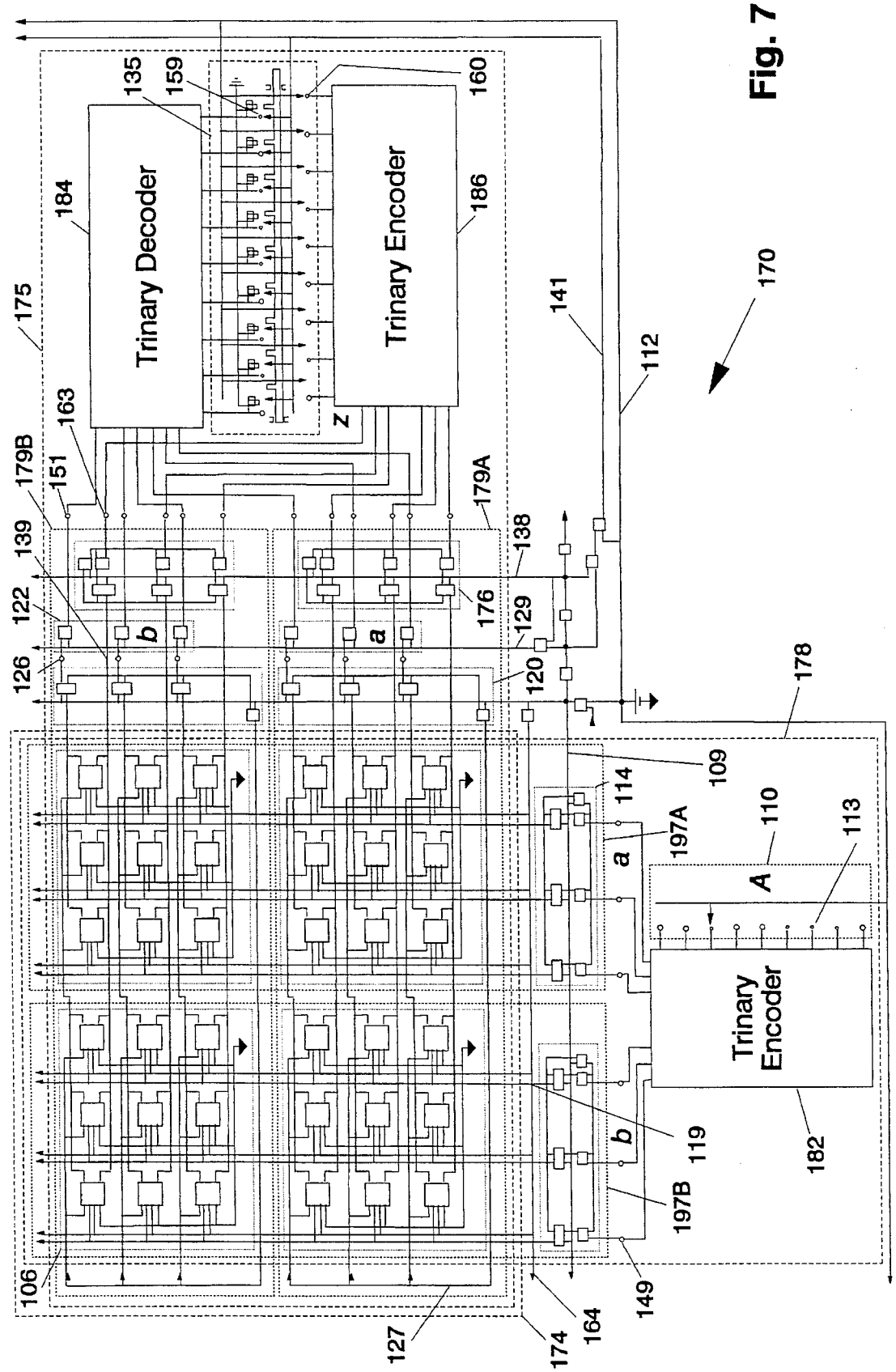
FIG. 7 is a schematic drawing of a digitized monolithic self-learning machine in which each sensor and actuator variable is digitized into a set of aggregate variables.

If the sensors 110 and actuators 135 of the self-learning machine 10 require a high resolution, many matrix input terminals 149 and matrix output terminals 126 are required. The number of memory cells 20 in the scalar submatrix 106 shown in FIG. 5 is equal to the product of the number of sensor terminals 113 and actuator/brake terminals 159. For example, a sensor 110 and actuator 135, each with a resolution of one part in 27 (approximately 4%) requires 27 sensor terminals 113 and 27 actuator/brake terminals 159. This requires a scalar matrix 106 with 27×27=729 memory cells 20. The number of memory cells 20 in a memory matrix 106 can be greatly reduced by digitizing its sensor variables 110 and actuator variables 135, as shown in FIG. 7.

Aggregate input variables

Each sensor variable A represented by the sensor 110 can be decomposed into a set of aggregate input variables A(a) and A(b) by a well know electrical device called an encoder 182. In the example shown in FIG. 7, the 9 values of sensor variable A, represented by the 9 sensor terminals 113, are decomposed by a trinary encoder 182 into two trinary (three-value) aggregate input variables A(a) and A(b) according to Equation 2, $$V=x^n,\qquad \text{Eq. 2}$$

where V is the number of value terminals 113 of the sensor variable A (in this case 9), x is the number of matrix input terminals 149 of each aggregate variable A(a) and A(b) (in this case 3), and n is the number of aggregate variables (in this case 2). This encoder 182 requires only x×n=6 matrix input terminals 149 in contrast to an undigitized sensor 110, which would require 9 matrix input terminals 149 for the 9 sensor terminals 113.

Each aggregate sensor variable A(a) or A(b) is connected to a set of submatrices 197A or 197B by a separate matrix interface circuit 114, which allows only one value 119 of each aggregate variable A(a) or A(b) to be latched in during a given transition cycle.

Aggregate output variables

Aggregate output variables Z(a) and Z(b) can be synthesized into the actuator variable Z by a well-known electrical device called a decoder 184. In the example shown in FIG. 7, two trinary (three-value) aggregate output variables Z(a) and Z(b) are decoded by a trinary decoder 184 into the 9 values terminals 159 of the actuator variable Z represented by actuator 135. The decoding is carried out according to Equation 2, where V is the number of value terminals 159 of the actuator variable Z (in this case 9), x is the number of value terminals 151 of each aggregate variable Z(a) and Z(b) (in this case 3), and n is the number of aggregate variables Z(a) and Z(b) (in this case 2). This decoder 184 can be driven by only x×n=6 actuator value terminals 151 in contrast to an undigitized actuator 135, which would require 9 actuator value terminals 151 to produce the same resolution as the digitized actuator 135.

Each aggregate actuator variable Z(a) or Z(b) is connected to a set of submatrices 179A or 179B by a separate matrix interface circuit 120 as if each aggregate variable Z(a) or Z(b) were a separate actuator variable.

Aggregate output co-variables

The actual position of the actuator 135 is measured by the closed contacts of the actuator feedback terminal 160 connected to the feedback encoder 186. The feedback encoder 186 digitizes the actual position 160 of the actuator 135, into values of the aggregate co-variables Z(a)' and Z(b)', as represented by matrix output co-terminals 163, according to the Equation 2, where V is the number of values of the actuator variable Z (in this case 9), x is the number of values of each aggregate variable Z(a)' and Z(b)' (in this case 3), and n is the number of aggregate variables (in this case 2). Each matrix output co-terminal 163 of these aggregate co-variables Z(a)' and Z(b)' are connected to a corresponding feedback terminal bus 139 through the matrix interface circuit 176 as if each aggregate co-variable Z(a)' and Z(b)' were a separate actuator covariable.

Trinary digitization

If the sensor A and actuator Z of the digitized self-learning machine shown in FIG. 7 were each to have 27 values instead of the 9 shown, the sensor variable A could be encoded into three trinary aggregate input variables A(a), A(b), A(c), and three trinary aggregate output variables Z(a), Z(b), Z(c) could be decoded into the 27 possible actuator positions. The 27 possible actuator positions could be encoded into the three trinary actuator co-variables Z(a)', Z(b)', Z(c)' needed to provide a feedback signal of the actual actuator position. The monolithic matrix 174 would require 9 matrix input terminals 149, 9 matrix output terminals 126, and 9 matrix output co-terminals 163, and its monolithic memory matrix 174 would require only 81 memory cells 20, compared to 729 memory cells 20 in the undigitized scalar matrix 106 with the same resolutions of the sensor 110 and actuator 135 of one part in 27.

The trinary digitized system shown in FIG. 7 is preferred over a binary (two-value), quadrary (four-value), or any other number system, because it requires fewer memory cells 20 for sensors 110 and actuators 135 with given resolutions. For example, a binary digitized system with 6 input and 6 output aggregate variables requires a monolithic matrix 174 with 144 memory cells 20, and can produce sensor 110 and actuator 135 resolutions of 1 part in 64. A trinary digitized system with 4 sensor and 4 actuator aggregate variables also requires a monolithic matrix 174 with 144 memory cells 20, but can produce resolutions of the sensor 110 and actuator 135 of 1 part in 81. The advantage of the trinary digitized system over the binary digitized system increases as the resolution of the sensors and actuators increase.

Description of a digitized multivariable monolithic self-learning auto-pilot

Figure 8:
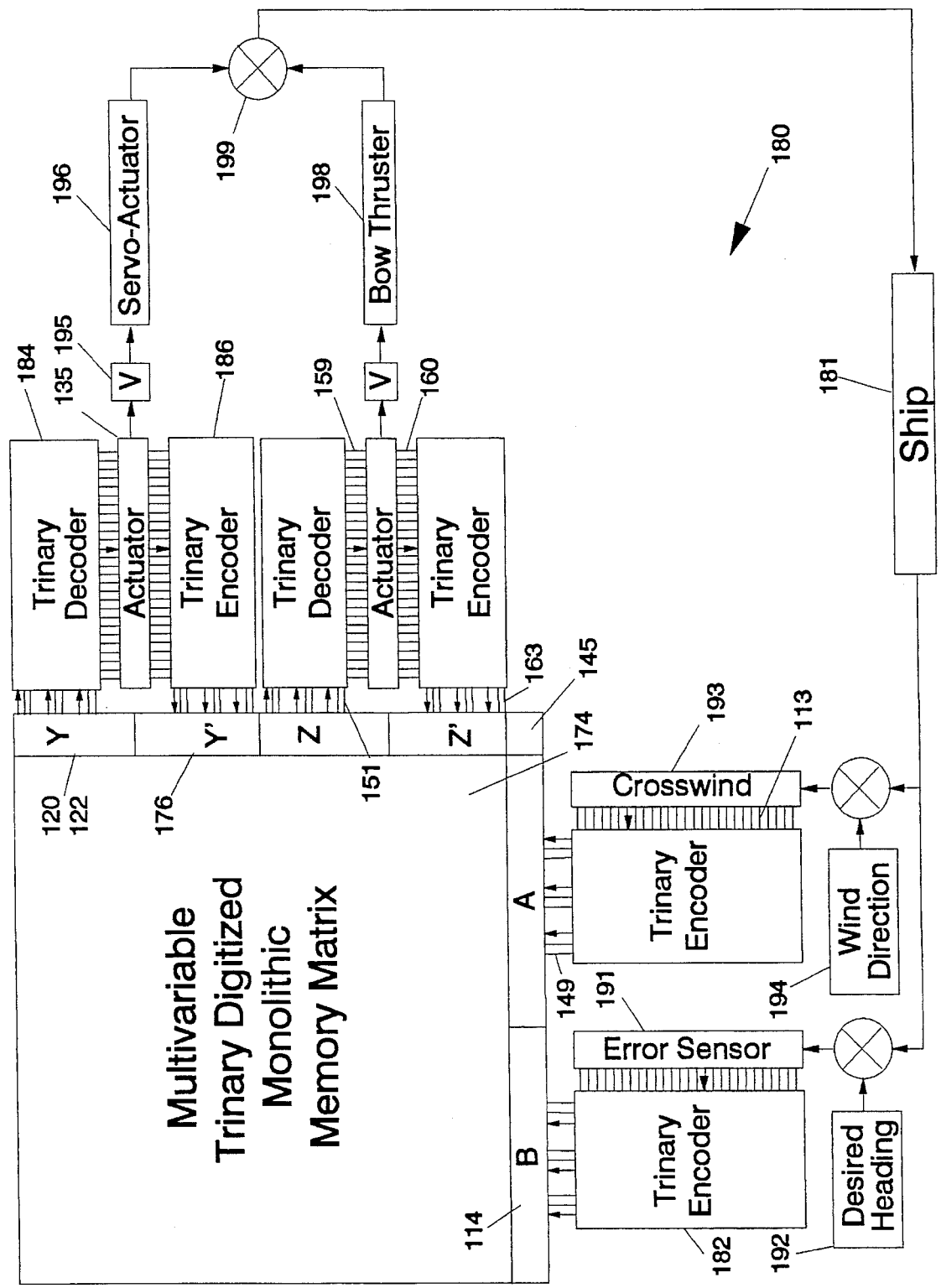
FIG. 8 is a block diagram of a ship auto-pilot using a digitized monolithic self-learning machine.

The digitized monolithic self-learning machine shown in FIG. 7 can be connected to a direction-error sensor 191, crosswind sensor 193, rudder servo-actuator 196, and bow thruster 198, forming the monolithic self-learning auto-pilot shown in FIG. 8. If trinary sensor encoders 182, trinary actuator decoders 184, and trinary feedback encoders 186 are used, each with 3 aggregate variables, 27 sensor values 113 can be recognized, 27 actuator positions 159 can be produced, and 27 actuator feedback positions 160 can be recognized. This 3.7% resolution may be adequate for many direction control applications.

The summing element 199 connected to the bow thruster 198 and rudder servo-actuator 196 indicates that the direction of the ship 181 is determined by the sum of the effects of the bow thruster 198 and rudder 196. The summing element 199 connected to the crosswind sensor 193 indicates that the crosswind direction is the sum or difference between the wind direction and the direction of the ship 181. The summing element 199 connected to the direction-error sensor 191 adds or subtracts the actual heading of the ship 181, as determined by a magnetic or gyro compass, to or from the actual heading of the ship 181, producing a direction error signal to the error sensor 191.

The digitized monolithic self-learning machine shown in FIG. 8 can produce a specific combination of rudder position 196 and bow thruster action 198 for each combination of direction error 191 and crosswind 193 in a unitary manner, or it can produce a given bow thruster action 198 for a given crosswind 193, and can produce a given rudder position 196 for a given direction error 191 in a diverse manner, depending upon which type of organization produces the most consistent results.

A greater force and/or a greater range of motion may be required than can be produced by the vernier actuators 135. In this case, the force/position servo-actuators 196 and 198 can be connected to the output of each vernier actuator 135 by means of servo-valves 195. If the operator of this self-learning machine 180 desires a different position of the servo-actuator 196, which runs at a high force level, the operator can adjust the position of the vernier actuator 135 or its servo-valve 195, which runs at a low force level. The self-learning machine 180 will learn the desired position forced upon the vernier actuator 135 under specific sensed conditions, and the servo-actuator 196 will reproduce these desired positions when these sensed conditions occur in the future.

Description of the self-learning algorithm

The diagram of the self-learning algorithm 302 in FIG. 9 shows the basic process used by a self-learning machines 10. The basic elements of the self-learning process are as follows: 1. The selection 306 of a particular action in each action period based upon the sensed conditions 308 at the beginning of a transition cycle, and the confidence levels for various actions stored in the control memory 310; 2. A reduction 312 of the confidence level for the selected action 306; 3. An increase 316 in the confidence level for the actual measured actions 330 that take place within that action period.

Some time delay 318 between sensed conditions and an attempt to produce actions 314 is required in a machine that has to work in the real physical world. The actual action produced by this machine may also be influenced by outside interferences 322 from the environment or machine operators. These actions 320 must also influence the sensor environment 324 through some delay 326 for the machine to produce an active line-of-behavior. The actual action 320 must also be measured 330 after some delay 328 to allow time for the actuators to reach the ultimate positions selected by the machine, and allowed by the environment.

The discontinuous operation of the self-learning machines 10 shown herein also requires a cycle-on signal 147 from a timing source 334. The timing source 334 may use the cycle-end signal 161 from each self-learning machine to start a new transition cycle.

Operation—FIGS. 1 to 9

The operation of the scalar self-learning machine 173 in FIG. 5, the multivariable monolithic self-learning machine 10 in FIG. 6, and the digitized self-learning machine 170 in FIG. 7 can be explained by examining the operation of the conditional memory cell 20 in FIG. 1, the logarithmic subtraction mechanism 56 in FIG. 2, the logarithmic response curves 100, 101, 102, and 103 in FIGS. 3A and 3B, and the matrix driver 108 in FIG. 4.

Operation of the conditional memory cell

The purpose of the conditional memory cell 20 shown in FIG. 1, is to establish and record the confidence level that a given value of a sensor variable A produces a given value of an actuator variable Z. The confidence level of this transition is stored in the memory cell 20 at the intersection of a given value of a sensor variable A and a given value of an actuator variable Z. This confidence level is stored as a position of the wiper arm 38 of the variable resistor 36 in this memory cell 20, which determines the sensitivity of its voltage-sensitive switch 35. This sensitivity is established in a given memory cell 20 by the number of times an output current signal 49 is conducted through the output-enable terminal 21, output-enable contacts 28, output contacts 42, and the minimum coil 48 to ground through the output terminal 52, representing a given value of the actuator variable Z (FIG. 4), in relation to the number of times a feedback current signal 51 is conducted from a corresponding value of the actuator co-variable Z' (FIG. 4) through the feedback terminal 54, maximum coil 50, and feedback-enable contacts 30 to ground through the feedback-complete terminal 58. The operation of each element of the conditional memory cell 20 is explained below.

Operation of the output-enable and feedback-enable connects

At the beginning of a transition cycle, the sense terminal 22 of a particular memory cell 20 may be energized by the latched input sense bus 119, as described earlier with reference to FIG. 4. This closes the normally open contacts 28 of the output-enable connect 29 and the normally open feedback-enable contacts 30 of the feedback-enable connect 31 in all of the memory cells 20 connected to that latched input sense bus 119 for the remainder of that transition cycle. Also, at the beginning of a transition cycle, output-enable terminal 21 of a particular memory may be energized by a voltage on its output-enable terminal bus 128 shown in FIG. 4.

Operation of the voltage-sensitive switch

At this time, a rising (ramp) voltage 104 appears at the search terminal 32 of every memory cell connect to the ramp generator 162 also shown in FIG. 4. A ramp current 33 is conducted to the ground 40 from the search terminal 32 through the voltage-sensitive switch 35. The ramp current 33 is divided into a search current 37 through the search coil 34 and wiper arm 38, and a slidewire current 39 through the variable resistor element 36. The ratio of search current 37 to slidewire current 39 is determined by the position of the wiper arm 38 on its variable resistor element 36.

When the wiper arm 38 is at the grounded end 47 of the variable resistor element 36, maximum current 37 flows through the search coil 34 at a given ramp voltage 104. When the wiper arm 38 is at the ungrounded end 41 of the variable resistor element 36, minimum current 37 flows through the search coil 34 at the same given ramp voltage 104. When the wiper arm 38 is in an intermediate position 43, an intermediate current 37 flows through the search coil 34 at the same given ramp voltage 104. This relation determines the sensitivity of the voltage-sensitive switch 45, as described by Eq. 1.

The normally open output contacts 42 of the voltage-sensitive switch 35 are designed to close when the wiper arm 38 is in the minimum current position 41, and the ramp voltage 104 is at a maximum value. Or, the output contacts 42 close when the wiper arm 38 is in the maximum position 47, and the ramp voltage 104 is at its minimum value. Therefore, the output contacts 42 of every memory cell 20 close at some ramp voltage 104 depending upon the position of the wiper arm 38 as the ramp voltage 104 approaches its maximum value.

Producing an output

A memory cell 20 can produce a voltage at its output terminal 52 at the beginning of a transition cycle if its output-enable terminal 21 is energized by a voltage on its output-enable terminal bus 128, its output-enable contacts 28 are closed by a voltage on its sense terminal 22 from its input sense bus 119, and its output contacts 42 are closed by a sufficient current 37 through its search coil 34 from the ramp voltage 104 on its search terminal 32.

Changing sensitivity of the voltage-sensitive switch

If a memory cell 20 produces an output, the current 49 flows to ground through the minimum coil 48 and the output terminal 52 of the selecting memory cell 20, causing the pole piece 46 on the bail 44 of the logarithmic subtraction mechanism 56 to be pulled toward the minimum coil 48. This causes the logarithmic subtraction mechanism 56 to move the wiper arm 38 toward the minimum position 41 by a fixed fraction of the wiper arm's position from the minimum position 41, as explained in the operation of the logarithmic subtraction mechanism 56 in FIG. 2. When the current 49 is terminated, the bail 44 of the logarithmic subtracting mechanism 56 can return to its normal center position 76 by the action of the springs 78. If a feedback voltage signal is presented to the feedback terminal 54, near the end of the transition cycle, the feedback-enable contacts 30 are closed by a voltage on the sense terminal 22, and a current 51 can flow to ground through the feedback-complete terminal 58. The current 51 through the feedback terminal 54 passes through the maximum coil 50, causing the pole piece 46 on the bail 44 of the logarithmic subtracting mechanism 56 to be attracted toward the maximum coil 50. This causes the logarithmic subtracting mechanism 56 to move the wiper arm 38 toward the maximum position 47 by a fixed fraction of the distance remaining toward the maximum position 47, as explained in the operation of the logarithmic subtraction mechanism 56 in FIG. 2. When this current 51 is terminated, the bail 44 of the logarithmic subtracting mechanism 56 can return to its normal center position 76 by the action of springs 78.

Operation of the logarithmic subtraction mechanism

With reference to the logarithmic subtraction mechanism 56 in FIG. 2, the minimum coil 48 is energized when its memory cell 20 produces an output current 49 through its output terminal 52, as explained in the discussion of FIG. 1. This output current 49 attracts the bail pole piece 46 toward the energized minimum coil 48, causing the bail armature 44 to rotate around the main shaft 64 toward the maximum stop 62A. The bail armature 44 strikes the minimum lever 60A at a position determined by the movable stop 72, and rotates the minimum lever 60A to a position determined by the fixed minimum stop 62A. This causes the minimum pawl 68A to rotate the minimum ratchet 70A through an angle determined by the angle of movement of the minimum lever 60A. The rotation of the minimum ratchet 70A is carried to the side member 88A of the differential 80 through a ratio determined by the number of teeth on the connecting gears 90A and 92A. This causes the output shaft 82 of the differential 80 to turn through an angle that is one-half the rotation of its side member 88A.

The rotation of the differential output shaft 82 turns the output gears 84 and 86. Output gear 86 meshes with a gear 96 connected to the main shaft 64, which is rigidly connected to the movable stop 72. Thus, the movable stop 72 moves toward the minimum stop 62A through some angle determined by the movement of the minimum lever 60A, the ratio of the connecting gears 90A and 92A, a one-half reduction inherent in the differential 80, and the ratio of the output gears 86 and 96. If the ratio of the connecting gears 90A and 92A is a reduction of one-half, and the ratio of the output gears 86 and 96 is a reduction of one-half, the total gear reduction from the minimum lever 60A to the movable stop 72 is $\frac{1}{2} \times \frac{1}{2} \times \frac{1}{2} = \frac{1}{8}$. This causes the movable stop 72 to move 12.5% of the distance remaining toward the fixed minimum stop 62A each time the minimum coil 48 is energized. Thus, the sensitivity changes according to a predetermined constant c, which is in this case 0.125.

In like manner, the maximum coil 50 is energized when a feedback current signal 51 can pass through its memory cell 20, as explained in the operation of FIG. 1. This causes the bail armature pole piece 46 to be attracted toward the maximum coil 50. This causes the bail armature 44 to rotate around the main shaft 64, striking the maximum lever 60B at a position determined by the movable stop 72, moving the maximum lever 60B to the position of the fixed maximum stop 62B. This causes the maximum lever 60B to rotate through an angle determined by the distance between the movable stop 72 and the fixed maximum stop 62B. This causes the maximum pawl 68B to rotate the maximum ratchet 70B through an angle determined by the angle of movement of the maximum lever 60B. The rotation of the maximum ratchet 70B is carried to the side member 88B of the differential 80 through a ratio determined by the number of teeth on the connecting gears 90B and 92B. This causes the output shaft 82 of the differential 80 to turn through an angle that is one-half the rotation of its side member 88B.

The rotation of the differential output shaft 82 turns the output gear 86 and output gear 96 that is rigidly connected to the main shaft 64 along with the movable stop 72. Thus, the movable stop 72 moves toward the maximum stop 62B through some angle determined by the movement of the maximum lever 60B, the ratio of the connecting gears 90B and 92B, the one-half reduction in the differential 80, and the ratio of the output gears 86 and 96. If the ratio of the connecting gears 90B and 92B is a reduction of one-half, and the ratio of the output gears 86 and 96 is a reduction of one-half, the total gear reduction is $\frac{1}{2} \times \frac{1}{2} \times \frac{1}{2} = \frac{1}{8} = c$. This causes the moveable stop 72 to move 12.5% of the distance remaining to the fixed maximum stop 62B each time the maximum coil 48 is energized.

The output gear 84, which is rigidly mounted upon the output shaft 82 of the differential 80, meshes with a wiper arm gear 98, which is rigidly mounted on the wiper arm shaft 97, which holds the wiper arm 38 shown in the memory cell 20 in FIG. 1. Thus, the movement of the wiper arm 38 bears the same relation as the movement of the movable stop 72 according to the ratio of output gears 86 and 96, and the wiper arm gears 84 and 98. In the example shown, the ratio of the output gears 86 and 96 is a reduction of one-half, and the ratio of the wiper arm gears 84 and 98 is unity, which means that the wiper arm 38 moves through twice the distance of the moveable stop 72. The ratio of the wiper arm gears 84 and 98 is chosen to use the full range of rotation of the wiper arm 38 on its variable resistor element 36.

The friction elements 91A and 91B on each differential side member hub 89A and 89B are used to overcome the friction of the wiper arm 38 on its slidewire 36. This assures that each side member 88A and 88B of the differential 80 moves only under the influence of the minimum and maximum coils 48 and 50.

Logarithmic response curves

FIG. 3A, shows some possible positions that the wiper arm 38 can take because of the operation of the logarithmic subtraction mechanism 56 shown in FIG. 2. The write-minimum curve 100 occurs when the wiper arm 38 starts at the maximum position and the minimum coil 48 in a given memory cell 20 is energized repeatedly. Using the gear ratios in the example described in FIG. 2, the first step 99A represents a movement of ⅛ of the distance between the maximum position 47 and minimum position 41, leaving ⅞ of the original distance remaining to the minimum position 41. The next step 99B represents ⅛ of the remaining distance toward the minimum position 41, or a movement of ⅛×⅞=⁷⁄₆₄ of the distance between the maximum position 47 and the minimum position 41. This series can be continued indefinitely, causing the position of the wiper arm to approach but not quite reach the minimum position 41. The same series applies to the position of the wiper arm 38 when the wiper arm 38 starts from the minimum position 41, and the maximum coil 50 in that memory cell 20 is energized repeatedly, as shown by the write-maximum curve 101.

With reference to FIG. 3B, if the minimum coil 48 and maximum coil 50 of a given memory cell 20 are energized sequentially, the position of the wiper am 38 will approach, but not quite arrive at the mid-position 43, where a nearly equal but opposite motion arrives in each sequence at the differential 80 in the logarithmic subtracting mechanism 56 shown in FIG. 2. Under these equal write-maximum and write-minimum conditions, if the wiper arm 38 starts at a point above the mid-position 43, the wiper arm 38 will move down toward the mid-position 43. If the wiper arm 38 starts at a point below the mid-position 43, the wiper arm will move up toward the mid-position 43. Usually, the wiper arm 38 operates below the mid-position 43, causing a write-minimum and write-minimum sequence in one transition cycle to move the wiper arm 38 to a higher sensitivity position.

Operation of the conditional memory matrix with a single memory cell

The single memory cell 20, matrix driver 108, and actuator 135 in FIG. 4 show the operation of a portion 172 of the self-learning machine 10. The matrix driver 108 provides the information from the sensor 110 and the actuator 135 needed for a matrix 106 of memory cells 20 to learn what action can be carried out for each sensed condition in each transition cycle.

Operation of the actuator brake

When the contacts of the cycle-on connect 146 are open between transition cycles, a voltage from the power source 105 is maintained on the actuator brake bus 141 through the normally closed contacts of the actuator brake disconnect 158. This causes a current to flow through the actuator brake switch 140, the actuator/brake terminal 159 and the stator coil 131 at the position where the actuator stator pole 132 lines up with an actuator armature pole 133. This brake current magnetizes the stator pole 132 at this location, causing the armature pole 133 at this location to be attracted to the stator pole 132 at this location. This causes the actuator armature 134 to be held in a specific fixed position determined by the location of the armature 134 when the current through the actuator brake 165 is applied.

Cycle-on signal

When the contacts of the cycle on connect 146 are closed by the cycle-on signal 147 from an outside timing source 334 at the beginning of a transition cycle, a voltage from the power source 105 is conducted to the input/output interface bus 109, ramp generator 162, coil of the actuator delay timer 148, the output-enable bus 127 through the normally closed contacts of the output-enable disconnect 121, and the input-enable bus 137 of the input interface 114 through the normally closed contacts of the input interface disconnect 118.

Operation of the matrix input interface circuit

The voltage from the power source 105 also appears at the input terminal 113 contacted by the sensor switch armature 111. This closes the normally open contacts of the input connect 157 at this location, causing a current to flow from the input-enable bus 137 to the input latch circuit 115 at this location at the beginning of a transition cycle. This causes a current from the input interface bus 109 to flow through the latching coil of the input latch circuit 115 and the coil of the input latch connect 116. This keeps the normally open contacts of the input latch circuit 115 closed for the remainder of the transition cycle, causing a voltage to appear on the input sense bus 119 at this location. This closes the normally open contacts of the input connect 116, causing a voltage to appear on the input disconnect bus 153, which energizes the coil of the interface disconnect 118 for the remainder of the transition cycle. This opens the normally closed contacts of the interface disconnect 118, which shuts off power to the input-enable bus 137 for the remainder of the transition cycle. This assures that only one input value of each sensor variable A is identified by the matrix input interface circuit 114 in each transition cycle.

The voltage on the input sense bus 119 energizes the sense terminal 22 of every memory cell 20 in the column of the latched input sense bus 119. This closes the output-enable contacts 28 and feedback-enable contacts 30 shown in FIG. 1 in all of the memory cells 20 in the column of the latched input bus 119 for the remainder of the transition cycle.

Operation of the ramp generator

The voltage from the power source 105 through the cycle-on connect 146 causes the motor 166 of the ramp generator 162 to start turning at the start of the transition cycle, bringing the contact armature 167 of the ramp generator 162 toward the grounded end of its slidewire resistor element 168. When the rotating contact armature 167 of the ramp generator 162 contacts the grounded end of the slidewire resistor element 168, a low voltage appears on the ramp bus 164. This ramp voltage 104 shown in FIG. 3C continues to rise as the contact armature 167 continues to rotate against the slidewire resistor element 168, until the contact armature 167 reaches the ungrounded end of slidewire resistor element 168. This causes a rising ramp voltage 104 to appear on the ramp bus 164, which is connected to the search terminal 32 and search coil 34 of every memory cell 20 in the memory matrix 106.

Selection of an output latch

As the ramp voltage 104 continues to rise, the output contacts 42 begin to close in the various memory cells 20 in these matrices 106. At some point in the voltage ramp 104, the output contacts 42 close in the conditional memory cell 20 with the most sensitive voltage-sensitive switch 35, an energized output-enable terminal bus 128, and a latched input sense bus 119. This selecting conditional memory cell 20 will conduct the output-enable voltage on its output-enable terminal bus 128 to its output terminal bus 123. Since the voltage from the output-enable terminal bus 128 can flow to ground through an output latch 115 of the output interface circuit 120, a current 49 through the minimum coil 48 of the selecting memory cell 20 will decrease the sensitivity of its voltage-sensitive switch 35, as described in the operation of the logarithmic subtracting mechanism 56 in FIG. 2.

Operation of the output-enable disconnect

In the portion 172 of the submatrix 106 shown in part in FIG. 4, the output terminal bus 123 is connected to the latch 115 of the output interface circuit 120 directly. When an output latch 115 is energized, the normally open contacts of the latch 115 close, causing a current to flow through the latching coil of the latch 115, the output latch connect coil 116, and the actuator enable coil 130. This causes the contacts of the output connect 116 to close, causing a voltage to appear on the output-enable disconnect bus 153. This opens the normally closed contacts of the output-enable disconnect 121, which disconnects the power to the output-enable bus 127. This prohibits any other memory cell 20 in that matrix 106 from producing an output, and terminates the current 49 through the minimum coil 48 of the selecting memory cell 20, allowing the bail 44 of the logarithmic subtracting mechanism 56 of the selecting memory cell 20 to return to its normal center position 76, as shown in FIG. 1.

It is desirable that the output-enable bus 127 be disconnected quickly once an output latch 115 has been energized, and the ramp voltage 104 rises slowly enough to prevent more than one memory cell 20 in a submatrix 106 from producing an output in a given transition cycle. However, time must be given for the minimum coil 48 in the selecting memory cell 20 to operate its logarithmic subtraction mechanism 56 before the output-enable bus 127 is disconnected. Therefore, a damper 155 can be placed upon the contact armature of each latch coil 115. This damper will not interfere with the process of selecting only one output because when the first latch 115 of the output interface 120 times out, power to any other latch 115 in that interface 120 will be cut off by the output-enable disconnect 121, prohibiting any other latch 115 from completing its delayed closure.

Actuator delay timer

There may be an intrinsic lag required between sensed conditions and the need to produce an action, due to the physical relations in the environment and the machine 10. This lag can be created in the self-learning machine 10 by the actuator delay timer 148. A current through the coil of the actuator delay timer 148 from the power source 105 causes the contacts of the actuator delay timer 148 to start closing against the retarding influence of the damper 155. After some delay determined by the damping characteristics of its damper 155, the contacts close in the actuator delay timer 148. This produces a voltage on the actuator-enable bus 129 through the actuator-enable disconnect 152, allowing a current to flow through the closed contacts of the selected actuator-enable connect 130 connected to the energized output latch-and-connect circuit 117 of the interface circuit 120. The output of the actuator delay timer 148 also causes a current to flow through the normally closed contacts of the brake reconnect 154. This opens the normally closed contacts of the brake disconnect 158, which disconnects the power to the actuator brake bus 141. This releases the actuator brake 165 so that the armature 134 can be positioned by the current through the selected actuator-enable connect 130.

Attempt to produce a specific action

The current through the closed contacts of the selected actuator-enable connect 130 causes a current to flow through the selected actuator coil 131. This magnetizes the stator pole 132 at this location, attracting the armature pole 133 that is related to this stator pole 132. This causes the actuator armature 134 to attempt to assume the selected position represented by the selected actuator value terminal 151.

Transition cycle sampling and action rate

Thus, the frequency of the cycle-on signal 147 from the outside timing source 334 determines the sampling rate of the sensors 110 and the action rate of the actuators 135 since it creates a voltage on the input/output bus 109, enables the interface circuit 114, starts the voltage ramp generator 162, energizes the output-enable bus 127, enables the output interface circuit 120, and starts the actuator delay timer 148. The frequency of the cycle-on signal 147 could be higher than ten cycles per second in a fast-acting machine, or lower than ten cycles per day in a weather forecasting system.

Re-engaging the actuator brake at the end of the feedback delay period

Some time may be required for the actuator armature 134 to assume the position called for by the energized stator coil 131. So some time must lapse before the actuator brake 165 is re-engaged, and the position of the armature 134 is measured in the feedback period. Therefore, the output of the actuator delay timer 148, which energizes the actuator-enable bus 129, also causes a current to flow through the coil of the feedback delay timer 150. This starts the timing of the feedback delay timer 150, creating a feedback delay period.

After some delay from the attempt to produce a specific action, the feedback delay timer 150 times out, closing the contacts in the feedback delay timer 150. This ends the feed-back delay period, and starts the feedback period. At the start of the feedback period, the coil of the actuator brake reconnect 154 is energized, which opens the normally closed contacts of the brake reconnect 154 for the remainder of the transition cycle, allowing the normally closed contacts of the brake disconnect 158 to re-close for the remainder of the transition cycle. This re-engages the actuator brake 165 until it is disengaged some time in the next transition cycle, and the actuator brake 165 at the position of the closed brake switch 140 attempts to hold the actuator armature 134 in the position encountered at the beginning of the feedback period.

Feedback of actual actuator position

When the feedback delay timer 150 times out at the beginning of the feedback period, a voltage is also produced on the feedback-enable bus 138. If the actuator armature 134 can assume the position of the selected actuator coil 131 and pole piece 132, then the feedback co-terminal 160 contacts close in the feedback switch 136 at the selected location. If the actuator armature 134 is not allowed to arrive at the selected location, or if the actuator armature is moved to a different location, to align another actuator pole 133' with another actuator coil 131' and pole piece 132' due to an outside influence, such as an operator or the environment, then the contacts of the feedback switch 136' close at the actual armature location 160'. This causes a voltage to appear on the matrix output co-terminal 163' at the location of the closed feedback contacts 160'.

Operation of the feedback interface

The voltage on the matrix output co-terminal 163 from the closed contacts 160 of the feedback switch 136 causes a current to flow through the coil of the input connect 157 of the feed-back interface circuit 176. This latches in the latch-and-connect circuit 117 in the feedback interface 176 connected to the energized feedback contacts 160. This produces a voltage on the feedback terminal bus 139 at this location, and disconnects the input-enable bus 137 of the feedback interface 176 for the remainder of the transition cycle. This prohibits any other feedback terminal bus 139 belonging to that feedback interface 176 from being energized during that transition cycle. A damper 155 is also placed on the contacts of the latch 115 to prohibit a rapidly moving armature 134 from energizing the feedback interface 176, since the position of a slewing armature is indeterminate.

Finding the feedback-selected memory cell

The voltage on the feedback terminal bus 139 causes a current 51 to flow though the feedback-complete terminal 58 of the one feedback-selected memory cell 20' in that submatrix 106 that is at the intersection of the energized feedback terminal bus 139 and the latched input sense bus 119, since that feedback-selected memory cell 20' is the only memory cell 20' on the energized feedback terminal bus 139 with closed feedback-enable contacts 30. This feedback-selected memory cell 20' may or may not be the same forward-selecting memory cell 20 that selected an output in that transition, depending upon whether the position selected by the forward-selecting memory cell 20 is the actual position of the actuator armature 134 at the beginning of the feedback period.

Increasing sensitivity of the feedback-selected memory cell

The current 51 through the feedback terminal bus 139, feedback terminal 54, maximum coil 50, feedback-complete terminal 58, and feedback-complete bus 143 of the feedback-selected memory cell 20' causes the bail 44 of the logarithmic subtraction mechanism 56 of the feedback-selected memory cell 20' to be pulled toward the maximum coil 50, causing the logarithmic subtraction mechanism 56 to move its wiper arm 38 toward the maximum position 47 by a fixed ratio of its position from the maximum position 47 to its extant position, as explained in the operation of the logarithmic subtraction mechanism 56 in FIG. 2.

Cycle-end signal

The cycle-end timer 156 times out after a predetermined delay from the start of the feedback period, and sends a cycle-end signal 161 to the outside timing source 334 indicating the cycle-on signal 147 can be terminated. When the cycle-on signal 147 is terminated, all of the components can return to their normal positions, and the bail 44 of the logarithmic subtracting mechanism 56 of the feedback-selected memory cell 20' can to return to its normal center position 76, as shown in FIG. 1.

Increase in sensitivity of a forward-selecting and feedback-selected memory cell In actual operation, the output selected by a memory cell 20 may not be carried out in every transition. This causes there to be more write-minimum movements than write-maximum movements of the wiper arm 38 in a given memory cell 20 after many transition cycles. Thus, the wiper arms 38 of most memory cells 20 dwell somewhere between the minimum position 41 and mid-position 43. Thus, a write-minimum and write-maximum sequence in a given transition cycle in a given memory cell 20 usually causes the sensitivity of the voltage-sensitive switch 35 to increase, as shown by the sensitivity curve 102 in FIG. 3B.

A windfall condition can occur in which the feedback terminal 54 of a memory cell 20 receives a feedback signal 51 without the output terminal 52 of that memory cell 20 having selected an output in that transition cycle. In this windfall condition, the sensitivity of the voltage-sensitive switch 35 in that windfall memory cell 20 increases according to the write-maximum curve 101 shown in FIG. 3A. But, this windfall condition cannot occur repeatedly because the sensitivity of that windfall memory cell 20 will rise until it is more sensitive than the other memory cells 20 on its input sense bus 119, causing that windfall memory cell 20 to start selecting actions, and then follow the normal rise curve 102 shown in FIG. 3B.

Operation of a controlled machine with a scalar matrix

The scalar machine 173 shown in FIG. 5 contains only one sensor 110 and one actuator 135, and a single scalar matrix 106 driven by a matrix driver 108. The scalar matrix 106 contains a memory cell 20 at the intersection of each input sense bus 119 and each output terminal bus 123. In a scalar matrix 106, only one memory cell 20 selects the specific output position of the actuator armature 134 that corresponds to its output terminal bus 123. This selecting memory cell 20 must be in the column of memory cells 20 connected to the latched input sense bus 119 belonging to the extant position of the sensor switch contact armature 111 that occurs at the beginning of a transition cycle. In a scalar machine 173, the scalar matrix selects the selecting memory cell 20 that has the highest historical probability that the position of the actuator armature 134 that it represents has occurred with the position of the sensor switch armature 111 that it represents. This selecting memory cell 20 is the most sensitive memory cell 20 in its column of memory cells 20 connected to the latched input sense bus 119, and is the most confident that the position of the actuator armature 134 that it represents can take place compared to any other position of the actuator armature 134.

In a scalar matrix, two or more positions of the sensor switch contact armature 111 can produce the same position of the actuator armature 134 in different transitions, but only one position of the actuator armature 134 can be produced for any one position of the sensor switch contact armature 111 in a given transition. The operation of the scalar machine 173 is explained in greater detail in the discussion of the operation of the matrix driver 108 in FIG. 4. The scalar matrix 106 can be part of the monolithic self-learning machine 10 shown in FIG. 6, or work by itself in a scalar machine 173.

Operation of the monolithic self-learning machine

Additional sensors 110, actuators 135, and scalar matrices 106 can be added to the scalar machine 173 shown in FIG. 5, and the scalar matrices 106 can be connected in a specific way to form a monolithic memory matrix 174, forming the multivariable monolithic self-learning machine 10 shown in FIG. 6.

Distributed forward-selection

At the beginning of a transition cycle, an input latch-and-connect 117 belonging to each sensor 110 connected to a monolithic matrix 174 energizes one input sense bus 119 in each set 178 of submatrices 106 belonging to each sensor 110. Each input sense bus 119 extends to the input sense terminals 22 of every memory cell 20 in the column of its input latch-and-connect 117 through every submatrix 106 in the monolithic matrix 174. The ramp generator 162 sends an interrogating signal to the search terminal 32 of every memory cell 20 in every submatrix 106 in the monolithic self-learning memory matrix 173. As the ramp voltage 104 increases, the output contacts 42 of memory cells 20 connected to the latched input sense bus 119 in each submatrix 106 begin to close, starting conductive paths from an output-enable terminal bus 128 to an output terminal bus 123 in each submatrix 106 in the manner described in the operation of the scalar matrix 106 in FIG. 5. The output contacts 42 may close in two or more memory cells 20 in a submatrix 106. However, no current can flow through these memory cells 20 until a forward-selecting conductive path is created from the output-enable bus 127 to an output latch-and-connect 117 in the output interface 120 by closed output-enable contacts 28 and output contacts 42 in a memory cell 20 in every submatrix 106 in the set 175 associated with a given actuator 135.

Distributed sensitivity reduction

When a forward-selecting conductive path is formed from the output-enable bus 127 through the set 175 of submatrices 106 associated with a given actuator 135 to the output latch-and-connect 117 representing the forward-selected value of that actuator 135, a current can flow through minimum coils 48 of the memory cells 20 that create this conductive path. This decreases the sensitivity of these selecting memory cells 20 in the manner discussed in FIGS. 1 through 3, which decreases the propensity of these memory cells 20 to create that conductive path to the selected value of their actuators 135 when the same set input sense buses 119 are latched in the future. Also at this time, the energized output latch-and-connect 117 disconnects the output-enable bus 127 to the set 175 of submatrices 106 associated with a given actuator 135. This prohibits any other output latch-and-connect 117 belonging to that actuator 135 from being energized in that transition cycle even if more conductive paths are formed by the rising ramp voltage 104.

Producing an action

After some predetermined delay, the cycle logic controller 145 disconnects the actuator brake bus 141, and activates the actuator-enable bus 129, causing each actuator 135 to attempt to produce the value held in its output latch-and-connect 117 of the output interface 120 in the manner described in FIG. 4. After another delay, the cycle logic controller 145 re-engages the actuator brake bus 141, and disengages the actuator-enable bus 129, causing each actuator 135 to attempt to remain in whatever position it was in when its actuator brake 165 was re-engaged.

Measuring the action

At this time, the cycle logic controller 145 also activates the feedback-enable bus 138, which activates the feedback interface 176 in each set 175 of submatrices 106 associated with a given actuator 135. This causes a voltage to appear the feedback terminal bus 139 corresponding to the actual position of each actuator 135 in each set 175 of submatrices 106. This feedback voltage signal is transmitted to the feedback terminals 54 of all of the memory cells 20 connected to the energized feedback terminal buses 139. However, this feedback signal can be conducted through only the one feedback-selected memory cell 20 in each submatrix 106 that is at the intersection of a latched input sense bus 119 and the energized feedback terminal bus 139.

The feedback-selected memory cell 20' conducts the feedback signal 51 to the feedback-complete bus 143 in that submatrix, causing a current to flow through the maximum coil 50 of that memory cell 20'. This increases the propensity of that memory cell 20' to select the actual results that occur at the actuator 135 in that transition cycle when those latched input sense buses 119 in that transition cycle are energized again in another transition cycle, as explained in the discussion of FIGS. 1 through 4.

Criterion for forward-selection through multiple sensor variables

In a monolithic matrix 174, the memory cells 20 on the forward-selecting conductive path may not be the most sensitive memory cells 20 on the latched input sense bus 119 in a given submatrix 106. However, the criterion for forming a forward-selection conductive path in a row of memory cells 20 to a given output latch-and-connect 117 of a given actuator 135 is as follows: Of all the memory cells 20 energized by the latched input sense buses 119 belonging to different sensors 110, the lowest sensitivity memory cell 20 in the selecting row belonging to a given value of a given actuator 135 must be higher than the lowest sensitivity memory cell 20 in any other row belonging to another value of a given actuator 135. Although the sensitivities of the forward-selecting memory cells 20 are decreased when they forward select an output latch-and-connect 117 of the output interface 120, the sensitivities of all the memory cells 20 that complete the feedback process are increased more than they were decreased as explained in the discussion of the Increase in sensitivity of a forward-selecting and feedback-selected memory cell in FIG. 4, making these memory cells 20 more likely to forward select the actual output values in that transition cycle the next time the sensed conditions in that transition occur again.

Unitary or diverse organization

The monolithic matrix 174 can transform specific combinations of values of multiple sensor variables A, B, etc. into a limited number of specific combinations of values of multiple actuator variables Z, Y, etc. in a unitary manner. The monolithic matrix 174 can also transform a specific set of values of a given sensor variable A into a specific set of values of a given actuator variable Z, despite the values of another sensor variable B in a diverse manner. It can do so if the distribution of sensitivities in the memory cells 20 in the submatrix 106 at the intersection of the given sensor A and given actuator Z produce the specific sensor/actuator relations, and if the sensitivities of all of the memory cells 20 in the rest of the set 175 of submatrices 106 in the row of that actuator 135 are set in a high-sensitivity state. In this diverse configuration the sensor A acts upon the actuator Z as if they were an independent machine that is separate from the rest of the sensors 110 and actuators 135 in the rest of the monolithic machine 10.

Self-organization

Thus, a monolithic machine 10 can act as if it were a single (unitary) machine, or as if it were a set of (separate) diverse machines, depending upon the distribution of sensitivities of its memory cells 20. The sensitivities of the memory cells 20 in a self-learning monolithic machine 10 can be adjusted by the actual actuator positions imposed by an operator and/or the task environment for each sensed condition. If the operator and/or task environment requires a unique combination of actuator positions for each combination of values of the sensor variables, the self-learning monolithic machine 10 will organize itself into a unitary system. If the operator and/or task environment requires that each actuator 135 operate independently in response to sensed conditions at given sensors 110, the self-learning machine will organize itself into a diverse system. Thus, a multivariable monolithic self-learning machine 10 is self-organizing according to the requirements of an operator and/or the task environment.

Operation of a digitized control system

As shown in FIG. 7, the sensor variable A and actuator variable z in the multivariable monolithic machine 10 shown in FIG. 6 can be replaced by the aggregate matrix input variables A(a), A(b) of a sensor encoder 182, aggregate matrix output variables Z(a), Z(b) of an actuator decoder 184, and aggregate output covariables Z(a)', Z(b)' of an actuator feedback encoder 186, forming a digitized self-learning machine 170 shown in FIG. 7. The digitized monolithic matrix 170 shown in FIG. 7 with a digitized sensor variable A and digitized actuator variable Z operates the same as a monolithic matrix with multiple sensor variables A, B, etc. and multiple actuator variables Z, Y, etc.

More sensors 110 and actuators 135 can be added to the digitized monolithic system machine 170 in FIG. 7 by extending the power bus 112, input/output interface bus 109, ramp bus 164, input sense buses 119, actuator-enable bus 129, feedback-enable bus 138, feedback buses 139, and actuator brake bus 141 to the additional sensors 110, actuators 135, submatrices 106, and elements of the matrix driver circuit 108.

The sensor encoder 182 assures that each value of the sensor variable A produces a unique combination of the aggregate input variables A(a) and A(b). The actuator decoder 184 assures that each unique combination of values of the aggregate output variables Z(a) and Z(b) produces a unique position value of the actuator variable Z. The actuator feedback encoder 186 assures that each measured actuator position Z' produces a unique combination of values of the aggregate output co-variables Z(a)' and z(b)'. These relations may be said to be unitary if the whole of each sensor state A is transformed into the whole of each actuator state Z by the encoder and decoder.

Each aggregate variable a or b is more or less significant. For example, the tens-place is more significant than the units-place in a decade number system. A digitized machine 170 can produce sensor/actuator relations based upon the combination of values of all of its sensor and actuator aggregate variables a, b, etc. in a unitary manner. In this case, a contact at a specific sensor terminal 113 produces an actuator position corresponding to a specific actuator/brake terminal 159. On the other hand, a digitized machine can produce sensor/actuator relations based upon the values of its most significant sensor and actuator aggregate variables a, b, etc. in a diverse manner. In this case, a generally high, middle, or low value of a sensor can produce a generally high, middle, or low value of its actuator. This feature greatly reduces the number of memory cells 20 and learning time required to produce machine behavior requiring less resolution than that provided by the sensor 110 and actuator 135 hardware. On the other hand, a machine 170 with digitized sensor and actuator variables can have a higher resolution with fewer memory cells 20 than an undigitized monolithic machine 10 or scalar machine 173.

Operation of a multivariable, digitized, monolithic, self-learning auto-pilot

Additional sensors 110, sensor encoders 182, actuators 135, actuator decoders 184, and actuator encoders 186, and additional monolithic submatrices 175 can be added to the digitized self-learning machine 170 shown in FIG. 7, forming the multivariable digitized monolithic self-learning auto-pilot 180 shown in FIG. 8. These elements can be connected to a compass with an adjustable card that establishes the desired heading 192, a wind-direction indicator 194, a rudder servo actuator 196, and the bow thruster 198.

The helmsman and the multivariable digitized monolithic self-learning auto-pilot 180 both attempt to operate the actuators 135 to control the direction of the ship 181. The helmsman and the self-learning machine 180 attempt to maintain a straight course by observing the values 113 of the direction errors sensor 191 and the crosswind sensor 193, and manipulating the rudder position actuator and bow thruster actuators 135. The helmsman can have a greater physical influence over the actuators 135 than the self-learning matrix 174 by operating the servo-valves 195 of the rudder and bow thruster. This causes the actuators 135 to feedback the actuator positions 160 produced by or allowed by the helmsman. After a period of learning, the self-learning matrix 174 will acquire and reproduce the control behavior of the helmsman, allowing the helmsman to withdraw from the control process.

Self-learning Algorithm

The sequence of events that take place in a transition cycle in the self-learning machines 10 can be summarized in the flowchart 302 in FIG. 9. A transition cycle starts when a cycle-on signal 147 from an outside timing source 334 causes the self-learning machine 10 to identify the input state 308 of the sensor environment 324. The control memory 310 selects an actuator output state 306 based upon the confidence level of the memory cells 20 for the sensed input conditions 308. As shown in FIG. 1, the confidence level of the memory cells 20 responsible for this selection are decreased according to some fixed ratio of their confidence levels in step 312. After a time delay 318 that may be required by the dynamics of the environment 322, the actuators attempt to produce outputs 314. After another delay 328 to allow the actuators to move to their selected positions 314, and to allow the outside influences 322 in the environment or a machine operator to influence the actual positions 320 of the actuators, the actual positions 320 of the actuators are measured in step 330, and the confidence levels of the memory cells 20 that would produce these actual positions 320 for the initial sensed conditions 308 in that transition are increased in step 316 by a fixed ratio of their confidence levels. Then the transition is terminated by a cycle-end signal 161 to the outside timing source 334. After another time delay 326 to allow the effects of the outputs 320 to influence the environment 324, another transition cycle is started by the outside time source 334.

Summary, Ramifications, and Scope

Accordingly, the reader can see that the self-learning machines shown herein can initiate action, and their environment and/or operators can restrict those actions that are physically impossible or inappropriate. This process allows a conditional self-learning machine to establish far more complex and effective behavior than a machine using a traditional associative memory, and may create many new applications, such as self-programing household controls, self-learning auto-pilots, and autonomous self-learning robots that can discover and incorporate behavior not even thought of by human operators.

Although the description above contains many specificities, these should not be construed as limiting the scope of the invention, but as merely providing illustrations of some presently preferred embodiments of this invention. Examples of the ramifications of this invention are given below.

Conditional predetermined machines

The minimum and maximum coils in the conditional self-learning memory cell can be eliminated, and the wiper arm of the variable resistor element can be position manually by a programer, forming a conditional predetermined memory cell. The feedback circuit in the self-learning monolithic memory matrix can be eliminated, forming a conditional predetermined memory matrix. The conditional predetermined memory cells can be placed in the conditional predetermined memory matrix, forming a conditional predetermined machine that can be programmed manually over time to produce the same kind of behavior as the conditional self-learning machines shown herein.

Absolute self-learning machines

The wiper arm and variable resistor of the conditional memory cells can be replaced with a toggle switch that is either opened by the minimum coil or closed to ground by the maximum coil. These absolute self-learning memory cells can be placed in monolithic matrices that have no ramp circuits, but cannot be used in any control systems requiring bidirectional operation, as shown in a divisional application of Ser. No. 08/155,587. Absolute self-learning memory cells can form an absolute self-learning machine that records and reproduces the last actual output state that takes places with a given input state in the manner of an associative memory. This manner of operation can be closely approximated in a conditional memory cell by using a predetermined constant c that is close to or equal to one.

Absolute predetermined machines

The maximum and minimum coils in the absolute memory cell can be eliminated, forming an absolute predetermined memory cell. The toggle switch in the absolute predetermined memory cell can be manually positioned in the open or closed position by a programmer. The feedback circuit in the absolute self-learning monolithic memory matrix also can be eliminated, and the absolute predetermined memory cells can be placed in the absolute predetermined memory matrix, forming an absolute predetermined machine that can be programmed to produce the same kind of behavior as an absolute self-learning machine.

Mixed conditional, absolute, self-learning and predetermined machines

The conditional self-learning, absolute self-learning, conditional predetermined, and absolute predetermined memory cells can be placed in a single matrix, forming a mixed memory matrix that may be predisposed to produce specific behavior by virtue of the distribution of each type of memory cell within the matrix, the programing of the predetermined cells, and the learning of the self-learning cells. The learning in the self-learning cells can be made to dominate this predisposed behavior if high enough sensitivities are obtained, or the machine can full back upon its predisposed behavior if it cannot find the consistent relations in its task environment needed to obtain high-sensitivity memory cells.

Other methods of digitization

Methods of digitization can be used other than the electrical encoders and decoders shown herein. For example, a mechanical encoder having a geared relation between each aggregate variable can be used in place of an electrical encoder. A mechanical decade encoder would have a ten-to-one reduction between each aggregate variable, and mechanical trinary encoder would have a three-to-one reduction between each aggregate variable, the latter being the preferred embodiment.

A mechanical decoder can be used in which the aggregate output variables of a matrix are connected to separate vernier actuators. These vernier actuators can be connected in series with a specific reduction in motion occurring within each connection such that the motion of the first actuator is reduced as it operates upon the second actuator, and so on. A mechanical decade decoder would have a reduction of ten-to-one between each actuator, and a mechanical trinary decoder would have a reduction of three-to-one, the latter being the preferred embodiment.

Each axis of a coordinate measuring machine, or any other machine with a rational coordinate system can encode a space or position vector into a set of aggregate sensor variables. Each axis of a robot or any other machine with a rational coordinate system can be used to decode the aggregate output variables of a matrix into a space or position vector. Another vector encoder can be used to measure the output vector, and provide a feedback signal to a self-learning matrix. The self-learning matrix can then establish a specific set of relations between an input vector and an output vector.

Other methods of implementation

Mechanical relays and physical contacts are used throughout the discussion of self-learning machines to demonstrate the operating principles of these machines without requiring a detailed understanding of solid state electronics. However, transistor gates, hall effect switches, and other solid state devices would be used as the solid state logic in the self-learning machines in most applications.

The mechanical logarithmic subtraction mechanism shown in FIG. 2 is presented to show how the types of response curves shown in FIG. 3A and FIG. 3B can be generated. Other methods of producing these types of responses could be used in most applications. For example, an electrical charge can be stored for long periods of time in a well-insulated capacitor. In like manner, the insulated gate of a metal nitride oxide semiconductor (MNOS) can be used to store a charge representing the sensitivity of a given conditional memory cell. This electrical charge can change the operating characteristics of the gate in much the same way that the variable resistor changes the operating characteristics of the voltage-sensitive switch. For example, this electrical charge can be reduced when its memory cell selects an output, and this electrical charge can be increased when its memory cell conducts a feedback-complete signal or back-selects a value of a co-variable. The charging and discharging of a capacitor is essentially logarithmic in the manner of the logarithmic subtraction mechanism in FIG. 2.

Indirect networks

The monolithic machines can be connected in an indirect network of machines in which the actuators of each input machine are indirectly coupled by intermediate environments to the sensors of output machines or intermediate machines. The forward-selecting transformations must proceed from the input machines through the intermediate environments and any intermediate machines to the output machines, and the back-selecting transformations must proceed from the actuator units through the intermediate environments and any intermediate units to the sensor units within one transition cycle. Digitized sensor machines also can be connected to digitized output machines and any digitized intermediate machines indirectly through intermediate environments using digitized sensors and digitized actuators. The digitized intermediate machines also can be connected to digitized actuator units indirectly through an additional intermediate environment using digitized sensors and digitized actuators. These networks of machines greatly increase the potential variety of behavior of these machines without greatly increasing the complexity of each machine.

Thus, the scope of the invention should be determined by the appended claims and their legal equivalents, rather than by the examples given.

I claim:

1. A method of selecting a value of at least one of an actuator means in response to an extant value of at least one of a sensor means in a sensing and action period, said selected value being determined by a record of a historical probability of each of an actual value of said actuator means occurring with each of said extant value of said sensor means in each of said sensing and action period, said method comprising:

a. determining a beginning and an end of said sensing and action period, and b. identifying said extant value of each said sensor means near a beginning of said sensing and action period, and c. examining said record of said historical probability belonging to each said extant value of said sensor means in said sensing and action period, and d. selecting said selected value of each said actuator means, said selected value having a highest of said historical probability of occurring with said extant value of each said sensor means in said sensing and action period, and e. making an attempt to produce said selected value of each said actuator means within said sensing and action period, and f. restraining said actuator means except when said attempt to produce said selected value is made, and g. making a measurement of an actual value of each said actuator means after a predetermined delay from said attempt to produce said selected value of said actuator means, said measurement being made within said sensing and action period, and h. establishing said record of said historical probability, said record being made according to each said actual value of said actuator means occurring with each said extant value of said sensor means during each of said sensing and action period, whereby i. said method of selecting a value of said actuator means in response to said value of said sensor means and said record of said historical probability provides a simple self-learning machine.

2. The method of claim 1, more specifically of applying to one of said sensor means and one of said actuator means, said method comprising:

a. making a measurement of a measured value of said sensor means, said measured value corresponding to an extant value of said sensor means at a beginning of said sensing and action period, and b. maintaining said measured value of said sensor means for a duration of said sensing and action period, and prohibiting a different value of said sensor means from being measured during said duration of said sensing and action period, and c. identifying an input set of a memory cell means, where said input set belongs to said measured value of said sensor means, and d. examining a sensitivity of each said memory cell means in said input set, and e. determining a selecting memory cell means from within said input set, said selecting memory cell having a highest said sensitivity within said input set, and where said selecting memory cell means belongs to a selected value of said actuator means, and f. making a reduction in said sensitivity of said selecting memory cell means, said reduction being equal to said sensitivity of said selecting memory cell means multiplied by a predetermined constant, said predetermined constant being in a range greater than zero to one, and g. making an attempt to produce said selected value of said actuator means, and h. restraining said actuator means except when said attempt to produce said selected value is made, and i. making a measurement of a measured value of said actuator means, said measured value of said actuator means corresponding to an actual value of said actuator means, said measurement being made after an action period, said action period being long enough to allow said actuator means to attempt to arrive at said selected value, and j. maintaining said measured value of said actuator means for a remainder of said sensing and action period, and prohibiting a different value of said actuator means from being measured during said remainder of said sensing and action period, and k. identifying a feedback set of memory cell means, where said feedback set belongs to said measured value of said actuator means, and l. identifying a feedback selected memory cell means, where said feedback selected memory cell means is at an intersection of said feedback set of memory cells means and said input set of memory cells means, and m. making an increase in a sensitivity of said feedback selected memory cell means, said increase being equal to a difference between a maximum sensitivity of said feedback selected memory cell means and an extant sensitivity of said feedback selected memory cell means, said difference being multiplied by said predetermined constant, wherein n. each said selected value of said actuator means has a highest historical probability of occurring with each said measured value of said sensor means within each said sensing and action period, whereby o. said method provides a simple self-learning machine with said one said sensor means and said one said actuator means.

3. The method of claim 1, more specifically applying to one of said sensor means and a plurality of said actuator means, said method comprising:

a. making a measurement of a measured value of said sensor means, said measured value corresponding to an extant value of said sensor means at a beginning of said sensing and action period, and b. maintaining said measured value of said sensor means for a duration of said sensing and action period, and prohibiting a different value of said sensor means from being measured during said duration of said sensing and action period, and c. identifying a plurality of an input set of a memory cell means, where each said input set belongs to said measured value of said sensor means, and wherein each said input set also belongs to each said actuator means uniquely, and d. examining a sensitivity of each said memory cell means within each said input set, and e. determining a selecting memory cell means within each said input set, wherein each said selecting memory cell means has a highest said sensitivity within each said input set, and each said selecting memory cell means belongs to each of a selected value of said actuator means, and f. making a reduction of each said sensitivity of each said selecting memory cell means, said reduction being equal to an extant sensitivity of each said selecting memory cell means multiplied by a predetermined constant, said predetermined constant being in a range greater than zero to one, and g. making an attempt to produce each said selected value of each of said actuator means, and h. restraining each said actuator means except when said attempt to produce said selected value is made, and i. making a measurement of a measured value of each said actuator means, said measured value of each said actuator means corresponding to an actual value of each said actuator means, said measurement being made after an action period, said action period being long enough to allow said actuator means to attempt to arrive at said selected value, and j. maintaining each said measured value for a remainder of said sensing and action period, and prohibiting a different value of said actuator means from being measured during said remainder of said sensing and action period, and k. identifying a plurality of a feedback set of said memory cell means, where each said feedback set belongs to each said measured value of each said actuator means uniquely, and l. identifying a plurality of a feedback selected memory cell means, where each said feedback selected memory cell means is at an intersection of each said feedback set of memory cells means and each said input set of memory cells means, and m. making an increase in said sensitivity of each said feedback selected memory cell means, said increase being equal to a difference between a maximum sensitivity of each said feedback selected memory cell means and an extant sensitivity of each said feedback selected memory cell means, said difference being multiplied by said predetermined constant, wherein n. each said selected value of said actuator means has a highest historical probability of occurring with each said measured value of said sensor means within each said sensing and action periods, whereby o. said method provides a simple self-learning machine with said one said sensor means and said plurality of said actuator means.

4. The method of claim 1, more specifically applying to a plurality of said sensor means and one of said actuator means, said method comprising:

a. making a measurement of a measured value of each said sensor means, said measured value corresponding to an extant value of each said sensor means at a beginning of said sensing and action period, and b. maintaining each said measured value of each said sensor means for a duration of said sensing and action period, and prohibiting a different value of each said sensor means from being measured during said sensing and action period, and c. identifying a plurality of an input set of memory cell means, where each said input set belongs to each said measured value of each said sensor means uniquely, and d. examining a sensitivity of each of said memory cell means in each said input set, and e. determining a selecting memory cell means within each said input set, said selecting memory cell means forming a selecting set of memory cell means, where said selecting set belongs to a selected value of said actuator means, wherein f. a lowest sensitivity memory cell means within said selecting set has a higher said sensitivity than a lowest sensitivity memory cell means in any other of an unselecting set of said memory cell means, where each said unselecting set belongs to each of an unselected value of said actuator means and said input set, and g. reducing each said sensitivity of each said selecting memory cell means, each said reduction being equal to an extant sensitivity of each said selecting memory cell means multiplied by a predetermined constant, and h. making an attempt to produce said selected value of said actuator means, and i. restraining said actuator means except when said attempt to produce said selected value is made, and j. making a measurement of a measured value of said actuator means, said measured value of said actuator means corresponding to an actual value of said actuator means, said measurement being made after an action period, said action period being long enough to allow said actuator means to attempt to arrive at said selected value, and k. maintaining said measured value for a remainder of said sensing and action period, and prohibiting a different value of said actuator means from being measured during said remainder of said sensing and action period, and l. identifying a feedback set of memory cell means, where said feedback set of memory cell means belongs to said measured value of said actuator means, and m. identifying a plurality of a feedback selected memory cell means, where each said feedback selected memory cell means is at an intersection of said feedback set of memory cells means and each said input set uniquely, and n. making an increase in said sensitivity of each said feedback selected memory cell means, said increase being equal to a difference between a maximum sensitivity of each said feedback selected memory cell means and an extant sensitivity of each said feedback selected memory cell means, said difference being multiplied by said predetermined constant, wherein o. said selected value of said actuator means has a highest historical probability of occurring with each said measured value of each said sensor means within each said sensing and action periods, whereby p. said method provides a simple self-learning machine with said plurality of said sensor means and said one said actuator means.

5. The method of claim 1, more specifically applying to a plurality of said sensor means and a plurality of said actuator means, said method comprising:

a. making a measurement of a measured value of each said sensor means, each said measured value corresponding to an extant value of each said sensor means at a beginning of said sensing and action period, and b. maintaining each said measured value of each said sensor means for a duration of said sensing and action period, and prohibiting a different value of each said sensor means from being measured during said sensing and action period, and c. identifying a plurality of an input set of memory cell means, where each said input set belongs to each said measured value of each said sensor means uniquely, and where each input set also belongs to each said actuator means uniquely, and d. examining a sensitivity of each of memory cell means in each said input set of memory cell means, and e. determining a selecting memory cell means within each said input set, said selecting memory cell means forming a selecting set of memory cell means, where each said selecting set belongs to a selected value of each said actuator means uniquely, wherein f. a lowest sensitivity memory cell means within each said selecting set has a higher said sensitivity than a lowest sensitivity memory cell means in any other of an unselecting set of said memory cell means, where each said unselecting set belongs to each of an unselected value of each said actuator means and said input set uniquely, and g. reducing said sensitivity of each said selecting memory cell means, said reduction being equal to an extant sensitivity of each said selecting memory cell means multiplied by a predetermined constant, and h. making an attempt to produce said selected value of each said actuator means, and i. restraining each said actuator means except when said attempt to produce said selected value is made, and j. making a measurement of a measured value of each said actuator means, each said measured value of each said actuator means corresponding to an actual value of each said actuator means, said measurement being made after an action period, said action period being long enough to allow each said actuator means to attempt to arrive at said selected value, and k. maintaining each said measured value for a remainder of said sensing and action period, and prohibiting a different value of each said actuator means from being measured during said remainder of said sensing and action period, and l. identifying a plurality of a feedback set of memory cell means, where each said feedback set of memory cell means belongs to each said measured value of each said actuator means, and m. identifying a plurality of a feedback selected memory cell means, where each said feedback selected memory cell means is at an intersection of said feedback set of memory cells means and said input set of memory cells means, and n. making an increase in said sensitivity of each said feedback selected memory cell means, said increase being equal to a difference between a maximum sensitivity of each said feedback selected memory cell means and an extant sensitivity of each said feedback selected memory cell means, said difference being multiplied by said predetermined constant, wherein o. each said selected value of each said actuator means has a highest historical probability of occurring with each said measured value of each said sensor means within each said sensing and action periods, whereby p. said method provides a simple self-learning machine with said plurality of said sensor means and said plurality of said actuator means.

6. The method of claim 5 further including a method of digitization useful in a digitized self-learning machine, said method comprising:

a. decomposing said extant value of said sensor means into a unique combination of values of a plurality of an aggregate matrix input variable means, said decomposing being accomplished by an encoding means, and b. selecting a specific combination of values of a plurality of an aggregate output variable means for each said unique combination of values of said plurality of said aggregate input variable means, wherein c. said specific combination of values is selected according to a highest of said historical probability of a unique combination of values of a plurality of an aggregate output co-variable means occurring with each said unique combination of values of said plurality of aggregate input variable means in said sensing and action period, said historical probability being stored in said memory cell means, and d. making a synthesis of a unique of a selected value of said actuator means from each said specific combination of values of said plurality of aggregate matrix output variable means, said synthesis being made by a decoding means, and e. making an attempt to produce said selected value of said actuator means, and f. restraining said actuator means except when said decoding means makes said attempt to produce said selected value, and g. making a measurement of a measured value of said actuator means, said measured value of said actuator means corresponding to said actual value of said actuator means, said measurement being made after an action period, said action period being long enough to allow said actuator means to attempt to arrive at said selected value, and h. decomposing said measured value of said actuator means into said unique combination of values of said plurality of said aggregate matrix output co-variable means, said decomposing being done by an encoding means, and i. establishing said historical probability between said unique combination of values of said aggregate output co-variables and said unique combination of values of said plurality of said aggregate matrix input variable means, whereby j. said method provides a digitized self-learning machine, said digitized self-learning machine requiring fewer said memory cell means than an undigitized self-learning machine.

* * * * *